(12) United States Patent
Sabottke et al.

(10) Patent No.: US 7,303,681 B2
(45) Date of Patent: *Dec. 4, 2007

(54) DYNAMIC MEMBRANE WAFER ASSEMBLY AND METHOD

(75) Inventors: Craig Y. Sabottke, Baton Rouge, LA (US); Bal K. Kaul, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 296 days.

This patent is subject to a terminal disclaimer.

(21) Appl. No.: 10/946,021

(22) Filed: Sep. 21, 2004

(65) Prior Publication Data
US 2005/0103710 A1    May 19, 2005

Related U.S. Application Data

(60) Provisional application No. 60/523,133, filed on Nov. 18, 2003.

(51) Int. Cl.
| | |
|---|---|
| B01D 61/14 | (2006.01) |
| B01D 71/02 | (2006.01) |
| B01D 71/06 | (2006.01) |
| B01D 53/22 | (2006.01) |
| B01D 61/00 | (2006.01) |
| B01D 63/08 | (2006.01) |

(52) U.S. Cl. .............. 210/653; 210/651; 210/652; 210/321.75; 210/321.84; 210/650; 95/45; 95/50; 95/47; 95/48

(58) Field of Classification Search ............ None
See application file for complete search history.

(56) References Cited

U.S. PATENT DOCUMENTS

| | | | |
|---|---|---|---|
| 3,398,091 A | 8/1968 | Greatorex | ............ 210/23 |
| 3,608,610 A | 9/1971 | Greatorex et al. | ............ 159/13 |
| 3,695,444 A * | 10/1972 | Iaconelli | ............ 210/321.75 |
| 3,930,990 A | 1/1976 | Brun et al. | |

(Continued)

FOREIGN PATENT DOCUMENTS

GB    2268186    1/1994

(Continued)

*Primary Examiner*—Krishnan S. Menon
(74) *Attorney, Agent, or Firm*—Gerard J. Hughes; Bruce M. Bordelon

(57) ABSTRACT

A method for separating aromatic hydrocarbons from a feed stream. The method includes flowing the feed stream through a first channel within a first wafer assembly that may contain an underflow distribution weir. Next, the feed stream is exposed to a first thin film polymer membrane. A stream permeates through the first thin film polymer membrane, and the permeate is produced from the first wafer assembly. The retentate is directed via a redistribution channel (such as a tube) to a second wafer assembly that may contain an underflow distribution weir. This retentate is exposed to a second thin film polymer membrane. A second permeate stream is created that permeates through the second thin film polymer membrane. The second permeate stream is conducted into the permeate zone and ultimately produced from the second wafer assembly. An apparatus for separating aromatic components from a feed stream is also disclosed. In the preferred embodiment, the apparatus includes a series of tandem wafer assemblies. The wafer assemblies comprise a first wafer, second wafer and third wafer. First and second membrane members are disposed within the wafer assemblies.

12 Claims, 12 Drawing Sheets

U.S. PATENT DOCUMENTS

| | | | |
|---|---|---|---|
| 4,340,475 A * | 7/1982 | Kraus et al. | 210/232 |
| 4,861,628 A | 8/1989 | Schucker | 427/245 |
| 4,925,459 A * | 5/1990 | Rojey et al. | 95/50 |
| 4,968,430 A | 11/1990 | Hildenbrand et al. | 210/640 |
| 5,030,355 A | 7/1991 | Schucker | 210/640 |
| 5,039,418 A | 8/1991 | Schucker | |
| 5,089,122 A | 2/1992 | Chmiel | 210/185 |
| 5,093,003 A | 3/1992 | Ho et al. | |
| 5,095,171 A | 3/1992 | Feimer et al. | |
| 5,238,563 A | 8/1993 | Smith, Jr. et al. | 210/321.74 |
| 5,266,206 A | 11/1993 | Baker et al. | |
| 5,275,726 A | 1/1994 | Feimer et al. | 210/321.74 |
| 5,288,712 A | 2/1994 | Chen | |
| 5,294,345 A | 3/1994 | Kaschemekat | 210/640 |
| 5,389,255 A | 2/1995 | Danziger et al. | 210/321.75 |
| 5,635,055 A | 6/1997 | Sweet et al. | 208/99 |
| 5,742,685 A | 4/1998 | Berson et al. | |
| 6,500,233 B1 | 12/2002 | Miller et al. | 95/50 |
| 6,649,061 B2 | 11/2003 | Minhas et al. | |
| 6,746,513 B2 | 6/2004 | Anderson | |
| 6,896,796 B2 | 5/2005 | White et al. | 208/208 R |
| 6,986,802 B2 | 1/2006 | Colling et al. | |
| 2002/0111524 A1 | 8/2002 | Minhas et al. | 585/818 |
| 2003/0101866 A1 | 6/2003 | Noack | 95/45 |
| 2003/0154856 A1 | 8/2003 | Anderson | 95/45 |
| 2003/0173255 A1 | 9/2003 | White et al. | 208/213 |
| 2004/0211705 A1 | 10/2004 | White et al. | 208/208 R |
| 2004/0211706 A1 | 10/2004 | White et al. | 208/208 R |

FOREIGN PATENT DOCUMENTS

| | | |
|---|---|---|
| JP | 63059310 | 3/1988 |
| WO | WO 86/01425 | 3/1986 |

\* cited by examiner

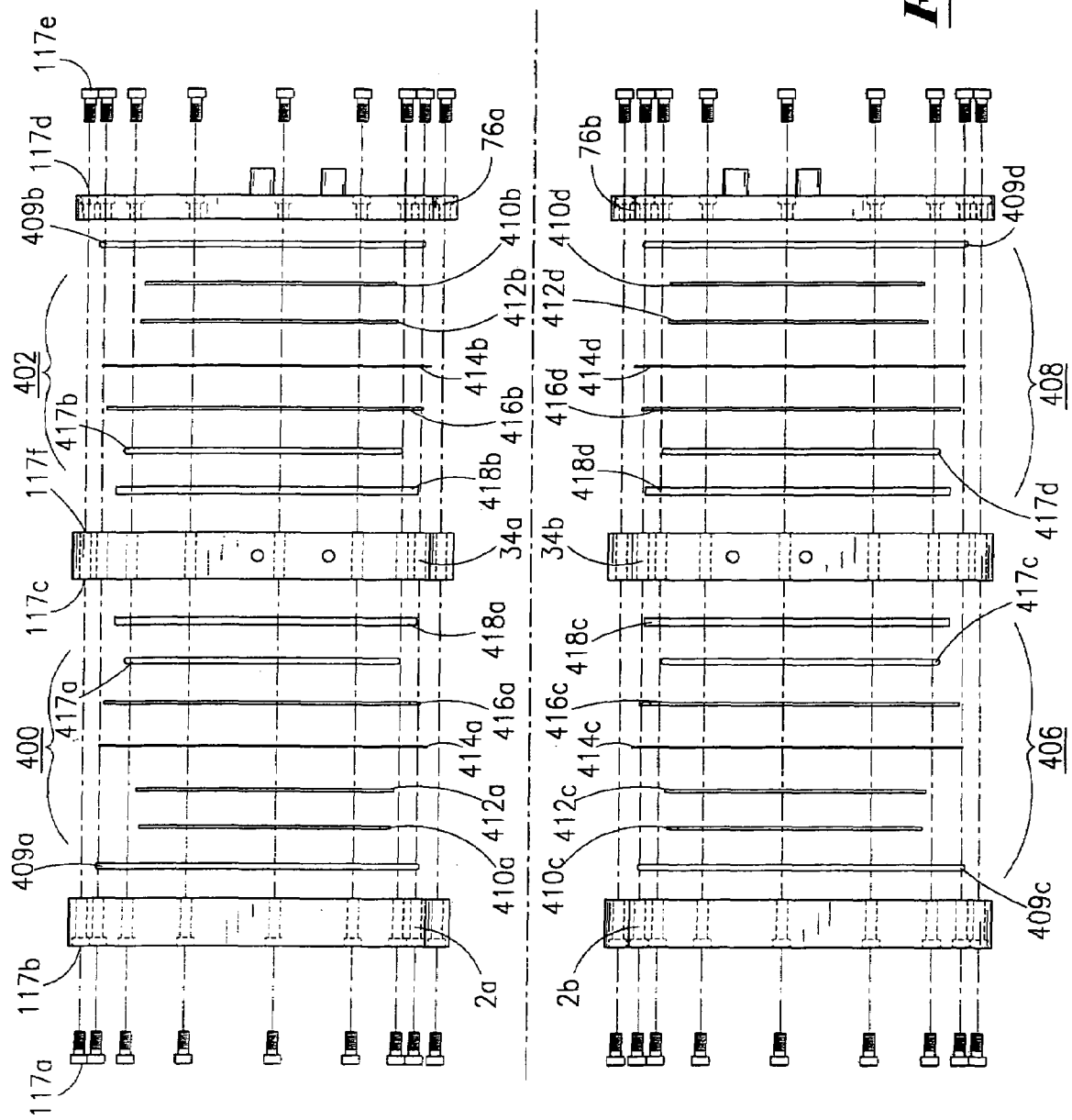

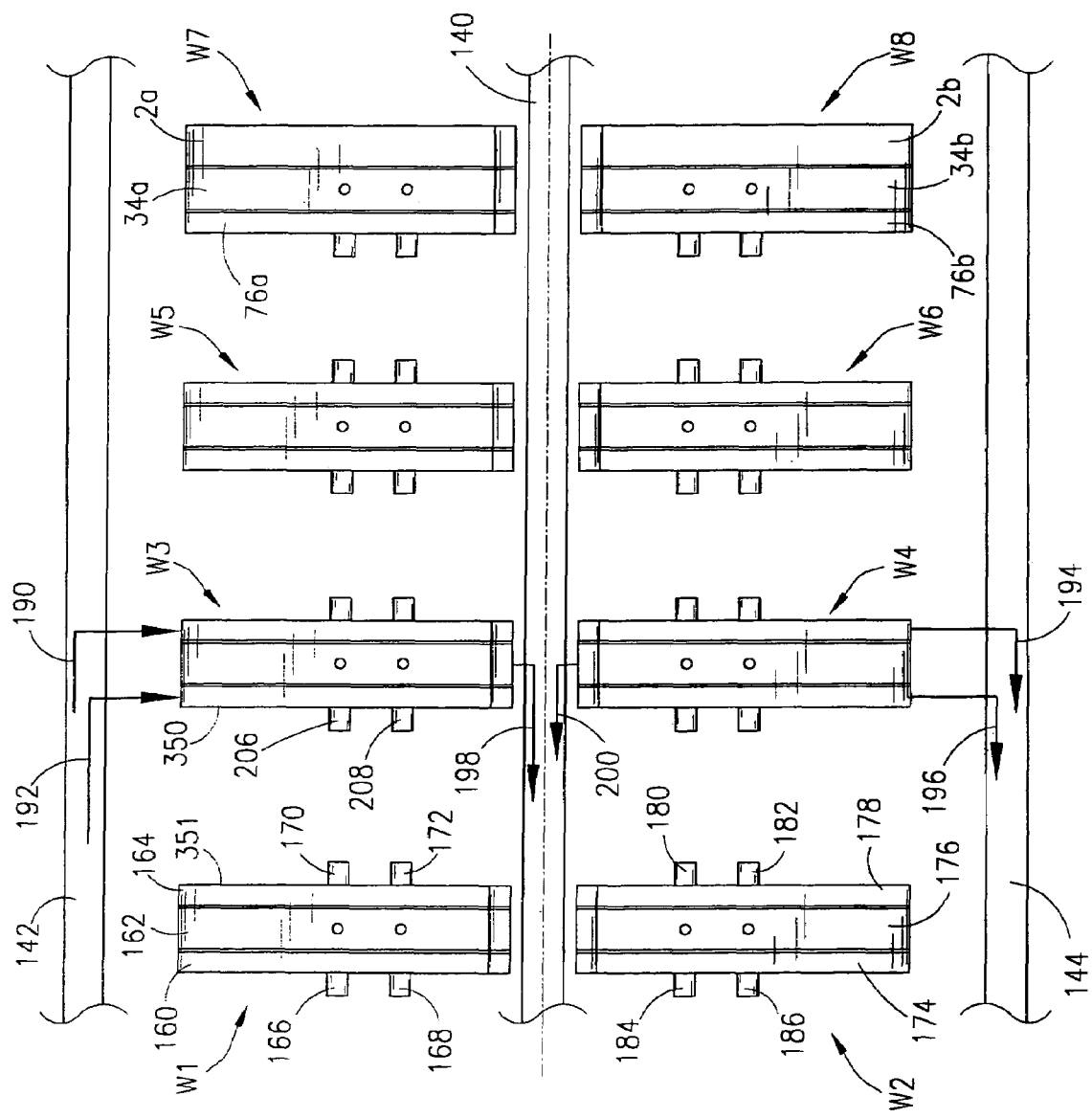

DYNAMIC MEMBRANE WAFER ASSEMBLY AND METHOD

CROSS-REFERENCE TO RELATED APPLICATION

This patent application claims benefit of U.S. provisional patent application Ser. No. 60/523,133 filed Nov. 18, 2003.

FIELD OF THE INVENTION

This invention relates to an apparatus and process for separation of aromatics from a feed stream. More particularly, but not by way of limitation, this invention relates to an apparatus and process for separation of aromatics from gasolines, naphthas, diesel fuels, etc., with the separation occurring via a membrane member.

BACKGROUND OF THE INVENTION

Membrane based separation processes such as reverse osmosis, pervaporation and perstraction are conventional (i.e., well-known). The pervaporation process is a technique of separation of liquid mixtures. A low-pressure vacuum is maintained on one side of the membrane media to provide a low energy approach to vaporizing liquid materials. The vaporization temperature of these liquid materials under vacuum conditions is lower than the temperature needed at elevated pressures. The liquid mixtures to be separated are conducted onto an upstream side of a membrane, which is essentially impervious to some of the liquid components but will permit selective passage of other components in a controlled manner. The downstream side of the membrane is usually exposed to a vacuum and the liquid components passing through the membrane can be removed in the vapor phase and condensed in a condenser.

In a pervaporation process, a desired feed component, e.g., the aromatic component, of a mixed liquid feed is preferentially dissolved into the membrane film. For membranes selective for the desired component, the desired component is preferentially adsorbed by the membrane. A membrane is exposed at one side to a stream of the mixture and a vacuum is applied to the membrane at the opposite side so that the liquid compound adsorbed migrates through the membrane via the well-known solution-diffusion mechanism. Accordingly, the desired component passes through the membrane and is removed as vapor from its downstream side, thereby providing room for the additional adsorption of the desired component on the upstream side of the membrane. A concentration gradient driving force is therefore established to selectively pass the desired components through the membrane from the upstream side to the downstream side.

Various membranes have been used in the prior art. For instance, U.S. Pat. No. 4,861,628, and U.S. Pat. No. 5,030,355 describe separating aromatics from non-aromatics such as naphtha, heavy catalytic naphtha (HCN), etc., by for example pervaporation using a suspension-coated membrane. The membrane is formed by depositing a polymer on a porous support layer, which is a fine dispersion or suspension and not a solid mass.

Among the conventional apparatus used with the pervaporation techniques are membranes used with spiral-wound and plate frames. For instance, in U.S. Pat. No. 3,398,091 covering a membrane separation using a cell comprised of a stack of basic units between a pair of end plates is disclosed. The semi-permeable membranes are held by spacers and a support. Heat transfer fluid is conducted via an inlet, conduit system, heating compartments and across heat transfer sheets.

Prior art pervaporation processes have used discrete equipment steps to achieve the desired separation. Interconnection of these equipment devices for large flow rate applications is expensive. Also, the prior art spiral-wound elements are expensive and difficult to manufacture for high temperature services. The majority of commercial spiral-wound element designs are limited to the 100-120 degree temperature range. To achieve separations of gasolines, naphthas, diesel fuels and higher boiling hydrocarbons usually higher temperatures are needed in excess of 120° C. There therefore is a need for an apparatus and process to apply pervaporation of fluids to hydrocarbon materials, especially those used as transportation fuels, to achieve separation of specific molecular types in an economical and efficient fashion.

SUMMARY OF THE INVENTION

In one embodiment, the invention relates to a dynamic membrane wafer assembly and membrane separation method. The dynamic membrane wafer assembly (also referred to herein as a "wafer assembly") comprises a dynamic thin film polymer membrane, called a "membrane", and a frame, called a "wafer", for supporting the membrane while interfering as little as practical with membrane permeation. The membrane comprises polymer selective for permeation of a desired component or species in a feed stream across the membrane in response to a pressure gradient, concentration gradient, etc., and a layer of adsorption media selective for adsorption of the desired component. Such membranes are compatible with pervaporation and perstraction separation. In a preferred embodiment, the adsorption media is selective for the adsorption of aromatic species. Suitable adsorption media selective for aromatics adsorption include those selected from the group consisting of activated carbon, molecular sieves, zeolites, silica gels, alumina, etc.

Thin film polymer membrane geometry is conventional and comprises a first (or "upstream") side and a second (or "downstream") side, the first and second sides being continuously joined along their perimeter to form a thin member. The wafer comprises a perimeter region for sealing the membrane perimeter against fluid flow and, optionally, at least one rib for supporting a side of the membrane away from the membrane's perimeter. For circular or semicircular wafers, for example, a rib would comprise (a) first and second ends attached to the wafer's perimeter region and (b) at least one side located along a chord spanning between the perimeter attachments. The rib(s) can support the upstream side of the membrane, the downstream side, or both the upstream and downstream sides. In an embodiment, one or more distribution weirs are used in the wafer assembly for distributing a feed stream in the vicinity of the thin film membrane. Mesh screens may also be used, generally to provide for turbulent flow in the vicinity of the membrane. When a screen is employed on the upstream side of the membrane, the screen is selected to be porous enough for feedstream conduction to the membrane but fine enough to filter particulate contaminants. Conventional filter paper is suitable. When a screen is employed on the downstream side of the membrane, it should have the following properties: mechanical stiffness to prevent membrane flexure, a weave smooth and fine enough to prevent membrane intrusion into the screen, and sufficient heat transfer capability to provide a source of heating across the membrane. As is known, increased membrane temperature leads to increased membrane permeation. A wafer assembly may contain a membrane support fabric positioned, preferably, on the upstream side of the membrane. In an embodiment, a rib member may be solid or have a bore therethrough. The method includes allowing a fluid to enter the bore of the rib member and heating the feed stream as the feedstream is being conducted through the wafer assembly. When a plurality of wafer assemblies are used, all or fewer than all of the wafer assemblies can contain such weirs, screens, support fabrics, and rib members, alone and in combination.

In a preferred embodiment, the thin film polymer membrane is mounted on a membrane support fabric such as Teflon, polyester, nylon, Nomex, Kevlar, etc., and further comprises (i) a porous metallic and/or porous ceramic support material abutting the membrane support fabric and (ii) a mesh screen, which may be used alone or in combination. Ceramic support material is preferred and, in the most preferred embodiment, is selected from the group consisting of Cordierite, Aluminum oxide, Zirconium Oxide, Mullite, Porcelain, Stealite and Silicon Nitride and special combinations of these. When fabric, porous support material, and screens are used, it should be understood that the ribs could support the thin film polymer membrane directly, or, alternatively, indirectly via the fabric, porous support material, and/or screen.

In a preferred embodiment, the membranes are cast on to a thin support of polymeric material, such as TEFLON. The membrane/support subassembly preferably is in contact with a first side of a thin metallic screen, such as a stainless steel screen. The perimeter of the membrane/support is held taut against the screen by applying radial tension towards the perimeter of the membrane and then, without releasing the tension, applying a compression force at the perimeter with an O-ring, for example, to hold the perimeter in position and the membrane taut. When the optional screen and support are used, the permeate side of the membrane is typically in contact with the optional screen and support. The retentate side of the membrane is preferably supported on heated ribs in the membrane assembly in order to heat the membrane isothermally.

In another embodiment, there is provided a method for separating desired components from a liquid feed stream, and particularly for separating aromatic hydrocarbons from a liquid feedstream comprising aromatic and non-aromatic hydrocarbons. The method comprises conducting the feed stream into a retentate zone within a first wafer assembly comprising the retentate zone and a permeate zone, with a dynamic membrane situated therebetween. The dynamic membrane comprises a layer of adsorption media selective for aromatics adsorption in contact and a polymer membrane. The adsorption media can be in the form of a powder, and the layer of adsorption media can be a porous layer. The layer of adsorption media is contact with the upstream side of the membrane. When the layer of adsorption media is porous, the feed stream is in fluid contact with both the layer of adsorption media and the upstream side of the membrane since the upstream side of the membrane would be exposed to the retentate zone through the adsorption layer's pores. A desired portion of feed stream (e.g., an aromatic portion) is adsorbed on the adsorption media. The portion of the feed stream that is unreacted with the adsorption media layer or subsequent thin film polymer layer is referred to herein as the retentate and can be conducted away from the process. Process conditions, such as pressure and the relative concentration of the feed stream components are regulated to cause a desired component present in the feed stream, such as the aromatic component, to adsorb onto the layer of adsorption media and then permeate through the membrane from the upstream side to the downstream side of the membrane. For example, suctioning can be used to provide a pressure of less than atmospheric pressure on the permeate side of the membrane. When the retentate side is at a higher pressure, a differential pressure is established across the membrane, leading to permeation across the membrane from upstream to downstream. Feedstream pressurization and permeate suctioning can be used to provide the pressure gradient, either alone or in combination. When feedstream pressurization is used, the feedstream may be in the vapor, liquid, or liquid-vapor regions of the feedstream phase diagram. When suctioning is used to provide a lower pressure in the permeate zone, the downstream side of the membrane produces a permeate vapor into the permeate zone, which can be condensed into liquid permeate. Accordingly, the layer of adsorption media is in fluid (including gaseous) contact with the permeate zone. The permeate in the permeate zone may be in the vapor state, and may be subsequently condensed into a liquid. The permeate can be conducted away from the permeate zone, and can be conducted away in either the liquid or vapor state. A retentate stream, which can be lean in the desired feedstream component can be conducted away from the retentate zone.

A plurality of wafer assemblies, each containing at least one dynamic membrane, can be used in combination. For example, wafer assemblies can be arranged in parallel, series, and series-parallel fluid flow circuits. In a preferred embodiment, all or a portion of the retentate is conducted away from the first wafer assembly to a second wafer assembly arranged in a parallel fluid-flow configuration with the first wafer assembly. The feed stream is conducted to a retentate zone in the second wafer assembly, and process conditions are regulated to cause a second desired feed stream component, that may be the same as the first desired feed stream component, from an upstream end of a second thin film polymer membrane, to the membrane downstream side, and into a second permeate zone. A second permeate, that may be the same as the first permeate, can be conducted away from the second permeate zone. All or a portion of second permeate conducted away from the second permeate zone can be combined with all or a portion of first permeate conducted away from the first permeate zone. A permeate stream is created that permeates through the second thin film polymer membrane, and into the permeate zone.

When two or more wafer assemblies are employed in parallel for feed stream separation a differential pressure can be established across the wafer assemblies to provide a driver for membrane permeation. In such cases, he permeate stream from the plurality of wafer assemblies can be produced by a suction driving force via the common central outlet tube. Vacuum pumping, vacuum ejecting, and condensation of the permeate vapors suitable for providing such a pressure differential. Permeate can be suctioned off from the permeate zone via an outlet tube via the common central outlet tube, and subsequently condensed, if desired. In an embodiment, the permeate from the second wafer assembly is combined with the permeate from the first wafer assembly, and the combined permeate stream is conducted away from the process. In another embodiment, a wafer assembly's permeate zone is heated with a hot media selected from the group consisting of steam heat, hot gas, hot oil or hot liquids. When a plurality of wafer assemblies are employed, all or fewer than all can employ permeate zone heating.

In another embodiment, there is provided an apparatus for separating aromatics from a feed stream. The apparatus comprises a first wafer assembly that includes a first, second and third wafer. The first wafer has a first and second side along with an outer rim. The second wafer is operatively attached with the first wafer, with the second wafer having a first side and a second side and an outer rim. The first wafer and second wafer form a first cavity area. The third wafer is operatively attached with the second wafer, with the third wafer having a first side and a second side and an outer rim, and wherein the second wafer and the third wafer form a second cavity area. The first and third wafers may contain underflow distribution weirs. The second wafer contains a permeate zone.

The apparatus further comprises a first and a second dynamic membrane member, where a membrane member comprises an independently selected dynamic thin film polymer membrane mounted on a membrane support fabric such as Teflon, polyester, nylon, Nomex, Kevlar, etc., and optionally, (i) a porous metallic and/or porous ceramic support material abutting the membrane support fabric and (ii) a mesh screen. The ceramic support material is preferred and, in the most preferred embodiment, is at least one of Cordierite, Aluminum oxide, Zirconium Oxide, Mullite, Porcelain, Stealite and Silicon Nitride. In the most preferred embodiment, the powdered layer of adsorption media is selected from the group consisting of activated carbon, molecular sieves, zeolites, silica gels, alumina or other commercially available adsorbents, etc. The first membrane member is disposed within the first cavity so that a first retentate area is formed therein and the second membrane is disposed within the second cavity so that a second retentate area is formed therein.

A seal means for sealing the wafer assemblies is also included. The seal means may comprise a gasket fitted between the first and second wafer and an O-ring positioned within a groove on the second wafer.

Other embodiments of seal means may be used. For instance, the seal means may comprise a first O-ring fitted about the outer rim in a groove on the first wafer, and a cooperating second O-ring fitted about the outer rim in a groove on the second wafer. In another embodiment, the seal means comprises double O-rings fitted about the outer rim in a pair of grooves on the first wafer and a cooperating pair of double O-rings fitted about the outer rim in a pair of grooves on the second wafer. In yet another embodiment, the seal means for the second and third wafers comprises a first O-ring fitted about the outer rim in a groove on the second wafer, and a cooperating second O-ring fitted about the outer rim in a groove on the third wafer. In still yet another embodiment, the seal means comprises double O-rings fitted about the outer rim in a pair of grooves on the second wafer and a cooperating pair of double O-rings fitted about the outer rim in a pair of grooves on the third wafer.

The apparatus may include a first feed tube disposed through the first wafer assembly, with the first feed tube delivering a feed stream to the wafer assembly. A first permeate tube is disposed through the first wafer assembly, with the first permeate tube delivering a produced permeate from the permeate zone of the first wafer assembly.

In another embodiment, the apparatus further comprises a tandem second wafer assembly that contains a fourth, fifth, and sixth wafer. The fourth wafer has a first side and a second side. The fifth wafer is operatively attached with the fourth wafer, with the fifth wafer having a first side and a second side, and wherein the fourth wafer and the fifth wafer form a third cavity area. The sixth wafer is operatively attached with the fifth wafer, the sixth wafer having a first side and a second side, and wherein the fifth wafer and the sixth wafer form a fourth cavity area. The fourth and sixth wafer may contain underflow distribution weirs.

The assembly further comprises a redistribution tube disposed through the first and second wafer assembly, for conducting at least a portion of the retentate from the first wafer assembly to the second wafer assembly. Third and fourth membrane members are mounted within the third and fourth cavity, respectively.

Additionally, in the preferred embodiment, the first and second wafer assembly is arranged in tandem thereby forming an assembly in a cylindrical geometry. The geometry is not limited to a circular cylinder geometry. Cylindrical forms based on semicircular, triangular, rectangular, and regular and irregular polygon cross sections may also be employed. The tandem wafer assemblies can then be arranged in a series of tandem wafer assemblies. The number of tandem wafer assemblies arranged in the series depends on design criteria such as flow capacity.

Advantages and features of the dynamic membrane wafer assembly and the polymeric membrane wafer assembly embodiment will now be discussed.

While not wishing to be bound by any theory or model, it is believed that it is advantageous to configure the wafer assemblies in a modular "wagon wheel" geometry that can be close-coupled with process heating and cooling zones in close proximity to the membrane surface where the pervaporation of fluids is occurring. Such a geometry would be advantageous because (1) that the entire assembly is contained within a single pressure vessel, (2) the assembly can be close-coupled to a vacuum system (e.g. vacuum pump) to achieve a highly integrated, compact equipment size, and (3) integration of process heating/re-heating with separation enhances the overall pervaporation of fluids. In the pervaporation of fluids, the heat load across the membrane separation layer is a variable depending on the permeate material and operating conditions (volume, heat of vaporization, vapor pressure versus operating pressure, etc).

While not wishing to be bound by any theory or model, it is also believed that the instant wafer assembly provides controllable re-heat flexibility, in a zone-by-zone sequence that is close coupled to the membrane surface where the pervaporation is occurring, e.g., by heating the wafer ribs. This creates a more isothermal system, where the effective permeation temperature can be more precisely controlled. The bulk phase molecular concentrations are also more uniformly controlled which enhances the overall separation performance. The preferred embodiment to achieve this isothermal performance is to use steam as the heating fluid. As the various zones in the membrane system array require heat, steam can rapidly condense locally to provide rapid heating of the membrane and permeate.

Accordingly, hot gas such as steam, or low value stack gas is used as the preferred heating media. In an embodiment, the hot gas flows through the wafer assemblies via the ribs and provide the necessary heat input to the system. In an embodiment, an alternative heater assembly, e.g., a serpentine coil tubular design with or without external fins is attached to the membrane wafers. The design of the finned tube heating elements can be adapted to accommodate additional hydrodynamic and heat transfer considerations and the design of the fins will also accommodate additional hydrodynamic considerations similar to the design of static mixer elements. In this embodiment, additional fluid mixing and flow turbulence favorably influence the thin film boundary layer on the high-pressure side of the membrane surface to enhance flux and selectivity by avoiding hydrodynamic static zones.

The cylindrical tandem wafer assemblies set forth herein are consistent with plant modular equipment scales typically found in the petrochemical industry. The cylindrical tandem wafer assemblies, which resemble a "wagon wheel" geometry are scalable and can be made in either large or small sizes. As an example of a small size device would be onboard automobile fuel separation devices.

In an embodiment, the dynamic thin film polymer membrane comprises a thin film polymer membrane and a thin film adsorption material in contact with the upstream side of the membrane, which may be in the form of a finely dispersed powder, bonded to a subsequent layer or a material that has been finely dispersed and cross-linked to form a porous layer within the membrane film. Techniques such as thin film coating, controlled pyrolisis, thermal treating, plasma coating, etc, can be used to achieve this functionality. The adsorptive layer enhances the local concentration gradient of the target molecules. The thin film adsorbent and membrane film are both selective for the target component or species in the feed stream. The layered, porous system allows the target molecule's concentration gradient (pressure gradient, etc.) to be controlled to enhance separation performance. In one of the preferred embodiments, the thin film adsorbent is selected from the group consisting of activated carbon, molecular sieves, zeolites, silica gels, alumina or other commercially available adsorbents, etc.

In another embodiment, pressure and temperature swing process control, and combinations thereof, can be used in connection with the adsorption media. In a pressure swing mode, the adsorption media sees a high pressure and low-pressure (vacuum) gradient. In the high-pressure zone, the target molecules are attracted to the media from the bulk fluid phase. As these target molecules migrate to the low-pressure zone, they desorb into bulk fluid phase on the low-pressure side.

BRIEF DESCRIPTION OF THE DRAWINGS

FIG. 5B is an exploded side elevation view of the two wafer assemblies seen in FIG. 4 detailing a second embodiment of the membrane member.

FIG. 7A is a schematic side elevation view of tandem wafer assemblies arranged in series.

DETAILED DESCRIPTION OF THE PREFERRED EMBODIMENTS

Figure 1A:
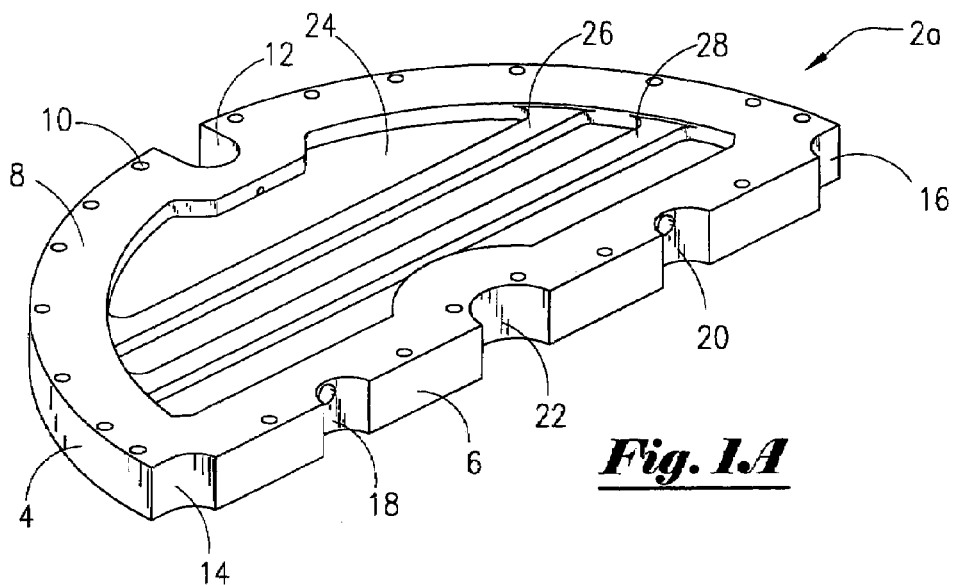
FIG. 1A is a perspective view of the first outer wafer.

The invention relates to dynamic membrane wafer assemblies, and the use of such wafer assemblies for separating desired species or components from liquid feedstreams.

As discussed, a membrane wafer assembly comprises a dynamic thin film polymer membrane (i.e., the membrane) and a frame (i.e., the wafer) for supporting the dynamic polymer membrane while interfering as little as practical with membrane permeation. The dynamic thin film polymer membrane comprises a layer of adsorbent selective for adsorption of a feed stream component or species and polymer selective for permeation of the same desired component or species in response to a pressure gradient, concentration gradient, etc.

Polymer used in a thin film polymer membrane within a wafer assembly should be selective for permeation of a desired feedstream component. Should it be desired to permeate different feedstream components across individual wafer assemblies in an arrangement of one or more such assemblies, the wafer assemblies can contain membranes comprising independently selected polymers. Additionally, in one of the preferred embodiments, the polymer membrane is independently selected from polymers useful for selective permeation of aromatic species. When a second polymer membrane is used, its polymer can be independently selected. Mixtures of polymers can be used in the membranes. The term "polymer" is to be used in the general sense of macromolecular, and includes, for example, homopolymers, copolymers, terpolymers, prepolymers, and oligomers.

Examples of polymers suitable for aromatic/non-aromatic separations of liquid hydrocarbons can be found in the following United States patents: U.S. Pat. No. 4,944,880 covering polyimide/aliphatic polyester copolymers, U.S. Pat. No. 4,946,594 covering crosslinked copolymers of aliphatic polyester diols and dianhydride, U.S. Pat. No. 5,093,003 covering halogenated polyurethanes, U.S. Pat. No. 5,550,199 covering diepoxide crosslinked/esterified polyimide-aliphatic polyester copolymers, U.S. Pat. No. 4,990,275 covering polyimide aliphatic polyester copolymers, U.S. Pat. No. 5,098,570 covering multi-block polymer comprising a urea prepolymer chain extended with a compatible second prepolymer, the membrane made therefrom and its use in separations, U.S. Pat. No. 5,109,666 covering polycoarbonate membranes for separations of aromatics from saturates, U.S. Pat. No. 4,828,773 covering highly aromatic anisotropic polyurea/urethane membranes and their use for the separation of aromatics from non-aromatics, U.S. Pat. No. 4,837,054 covering thin film composite membrane prepared by deposition from a solution, U.S. Pat. No. 4,861,628 covering thin film composite membrane prepared by suspension deposition, U.S. Pat. No. 4,879,044 covering highly aromatic anisotropic polyurea/urethane membranes and their use for the separation of aromatics from non-aromatics, U.S. Pat. No. 4,914,064 covering highly aromatic polyurea/urethane membranes and their use for the separation of aromatics from non-aromatics, U.S. Pat. No. 4,921,611 covering thin film composite membrane prepared by deposition from a solution, U.S. Pat. No. 4,929,357 covering Isocyanurate crosslinked polyurethane membranes and their use for the separation of aromatics from non-aromatics, U.S. Pat. No. 4,983,338 covering isocyanerate crosslinked polyurethane membranes and their use for the separation of aromatics from non-aromatics, U.S. Pat. No. 5,030,355 covering thin film composite membrane prepared by suspension deposition, U.S. Pat. No. 5,039,417 covering membrane made from a multi-block polymer comprising and imide or amide-acid prepolymer chain extended with a compatible second prepolymer and its use in separations, U.S. Pat. No. 5,039,418 covering membrane made from a multi-block polymer comprising an oxazolidone prepolymer chain extended with a compatible second prepolymer and its use in separations, U.S. Pat. No. 5,039,422 covering multi-block polymer comprising a urea prepolymer chain extended with a compatible second prepolymer, the membrane made therefrom and its use in separations, U.S. Pat. No. 5,049,281 covering multi-block polymer comprising of first prepolymer made by combining epoxy with diamine, chain extended with a compatible second prepolymer, the membrane made therefrom and its use in separations, U.S. Pat. No. 5,055,632 highly aromatic polyurea/urethane membrane and their use for the separation of aromatics from non-aromatics, U.S. Pat. No. 5,063,186 covering highly aromatic polyurea/urethane membranes and their use of the separation of aromatics from non-aromatics, U.S. Pat. No. 5,075,006 covering isocyanerrate crosslinked polyurethane membranes and their use for the separation of aromatics from non-aromatics, U.S. Pat. No. 5,096,592 covering multi-block polymer comprising on ester prepolymer, chain extended with a compatible second prepolymer, the membrane made therefrom and its use in separations, U.S. Pat. No. 5,098,570 covering multi-block polymer comprising a urea prepolymer chain extended with a compatible second prepolymer, the membrane made therefrom and its use in separations, U.S. Pat. No. 5,130,017 covering multi-block polymer comprising a first amide acid prepolymer, chain extended with a compatible second prepolymer, the membrane made therefrom and its use in separations, U.S. Pat. No. 5,221,481 covering multi-block polymer comprising an ester prepolymer, made by combining epoxy with polyester chain extended with a compatible second prepolymer, the membrane made therefrom and its use for separations, U.S. Pat. No. 5,290,452 covering crosslinked polyester amide membranes and their use for organic separations, U.S. Pat. No. 5,028,685 covering halogenated polyurethanes, U.S. Pat. No. 5,128,439 covering saturated polyesters and crosslinked membranes therefrom for aromatic/saturate separations, U.S. Pat. No. 5,138,023 covering unsaturated polyesters and crosslinked membranes therefrom for aromatic/saturate separation, U.S. Pat. No. 5,241,039 covering polyimide/aliphatic polyester copolymers without pendent carboxylic acid groups, U.S. Pat. No. 5,012,035 covering polyphthalate carbonate membranes for aromatic/saturates separation, U.S. Pat. No. 5,012,036 covering polyarylate membranes for aromatic/saturates separations, U.S. Pat. No. 5,177,296 covering saturated polyesters and crosslinked membranes therefrom for aromatics/saturates separation, U.S. Pat. No. 5,180,496 covering unsaturated polyesters and crosslinked membranes therefrom for aromatics/saturates separation, U.S. Pat. No. 5,107,058 covering olefin/paraffin separation via membrane extraction, U.S. Pat. No. 5,107,059 covering iso/normal paraffin separation by membrane extraction. Other suitable polymers include polyacrylonitrile ("PAN") and polysulfone ("PS"). In an embodiment, PVA and PS membranes are supported on a non-woven polymer support, such as porous polyester. Thin (e.g., 0.01 micrometer to 10 micrometer) polymer layers can be used to enhance selectivity. For example, thin layers of polyvinyl alcohol ("PVA"), polydimethylsiloxane ("PDMS"), and cellulose esters can be used.

A dynamic polymer membrane wafer assembly comprises a dynamic polymer membrane and at least one wafer. The wafer will now be described in terms of particular embodiments relating to the separation of aromatics from a liquid feed containing aromatic and non-aromatic components, as shown in the figures. It should be noted that the invention is not limited to such embodiments.

A wafer suitable for use in an embodiment is set forth in FIG. 1A. More than one wafer can be employed in a wafer assembly. While the wafer is shown in the geometry of a thin semicircular cylinder, it should be understood that other cylindrical geometries are suitable; for example, cylinder having a cross sections such as circular, triangular, rectangular, regular polygon, and irregular polygon cross sections can be used. Referring now to FIG. 1A, a perspective view of the first outer wafer 2a will now be described. The first outer wafer 2a is generally a semicircular solid member. The first outer wafer contains a semicircular outer edge 4 that extends to the radial surface 6. The semicircular outer edge 4 contains a rim 8, with the rim 8 having a plurality of openings, as seen for instance at 10, for placement of fasteners such as screws, or O-ring grooves which are not shown in this figure. The semicircular outer edge 4 contains a first indentation 12 at the top portion (also referred to as the apex) of the wafer 2a. The indentation 12 is configured to receive a tubular member, as described below.

The wafer 2a also contains a first corner indentation 14 and a second corner indentation 16, with the corner indentations 14, 16 being configured to also receive tubular members. The radial surface contains a first side indentation 18 and a second side indentation 20, along with a center indentation 22, which is configured to receive and be operatively associated with a tubular member. The functions of the tubular members are different and will be more fully set below. As discussed, the wafer 2a has a solid back wall 24. In other words, the wafer 2a is in the form of a plate. The back wall 24 has two underflow weirs that traverse it, namely underflow weir 26 and underflow weir 28. The weirs 26, 28 are raised projections that will alter the flow pattern of the feed stream as will be more fully set out below. The weirs 26, 28 also add to the structural support of the wafer 2a. For larger diameter systems, additional ribs and indentations for tubular members can be provided.

Figure 1B:
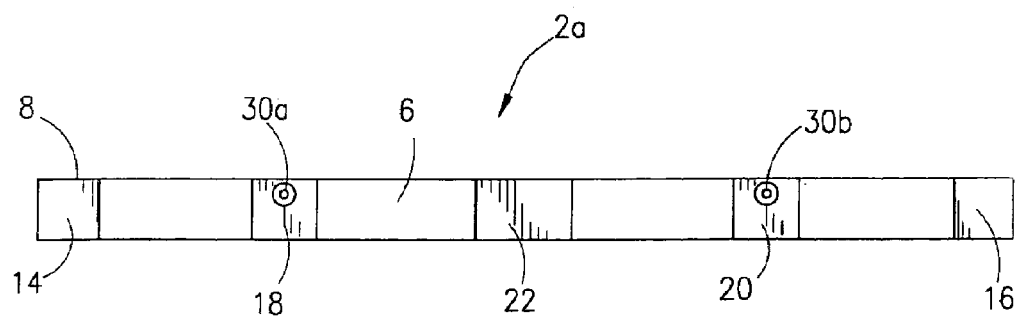
FIG. 1B is a side elevation view of the first wafer of FIG. 1A.
Figure 1C:
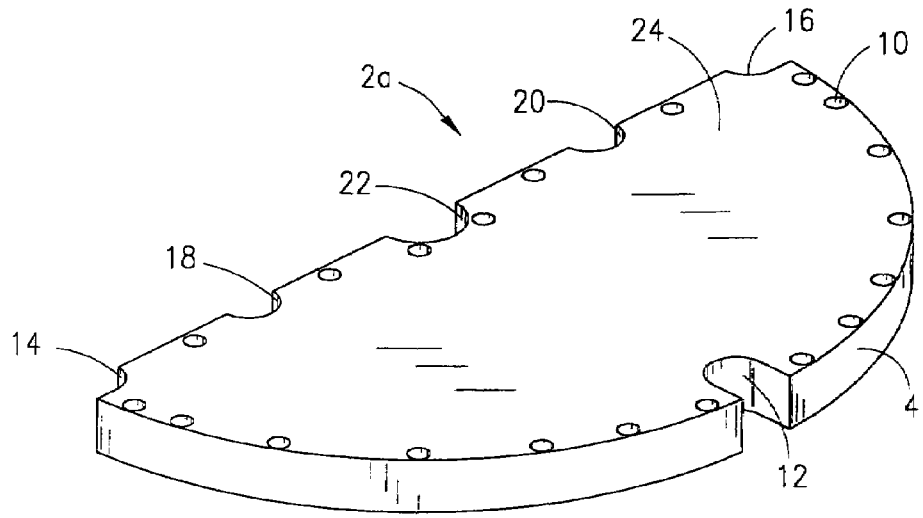
FIG. 1C is a perspective view of the first outer wafer of FIG. 1A from the opposite plane.

FIG. 1B is a side elevation view of the first wafer 2a of FIG. 1A. It should be noted that like numbers appearing in the various figures refer to like components. Thus, the radial surface 6 is shown along with the indentations 14, 18, 22, 20, and 16. FIG. 1B also depicts the rim 8 that extends to the back wall 24. Also shown are the redistribution holes 30a, 30b. Referring to FIG. 1C, a perspective view of the first outer wafer of FIG. 1A from the opposite plane is shown. FIG. 1C depicts the back wall 24.

Figure 2A:
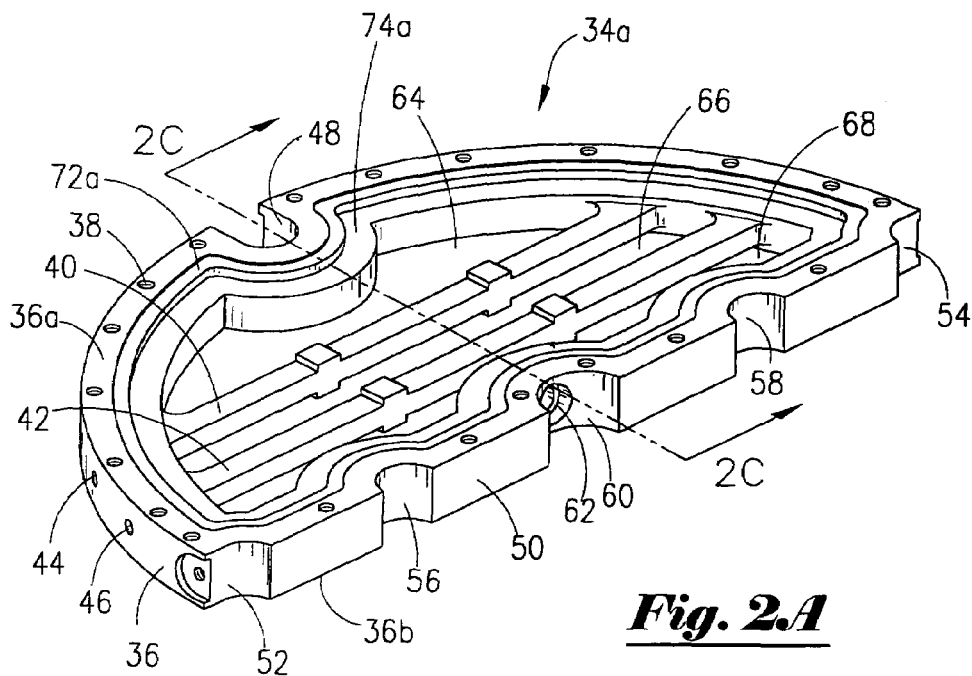
FIG. 2A is a perspective view of the internal wafer.

Referring now to FIG. 2A, a perspective view of the internal wafer 34a will now be described. The internal wafer 34a is also a semicircular contour 36 and has an upper outer rim 36a that has contained therethrough openings, such as the opening 38, for placement of fastener means such as screws, or O-ring grooves, which are not shown in this figure. The internal wafer 34a has a first rib member 40 and a second rib member 42. The ribs 40, 42 have bored holes 44, 46 there through. The bored holes 44, 46 will allow a hot media, such as steam, to flow through the ribs thereby heating the contents of the wafer assembly, as will be more fully set forth below. For larger diameter systems, additional ribs and indentations for tubular members can be provided.

The internal wafer 34a has a top indentation 48, at the apex, for placement of a tubular member. The outer rim 36a extends to the radially flat surface 50. The radially flat surface 50 will have a first corner indentation 52 and a second corner indentation 54; additionally a first side indentation 56 and a second side indentation 58 is included. The center indentation 60 is shown with the aperture 62 there through. The internal wafer 34a does not contain a wall, but instead has open areas. Therefore, the numerals 64, 66, and 68 seen in FIG. 2A represent open areas which correspond to the permeate zone. The internal wafer 34a has a first ledge 72a and a second ledge 74a.

Figure 2B:
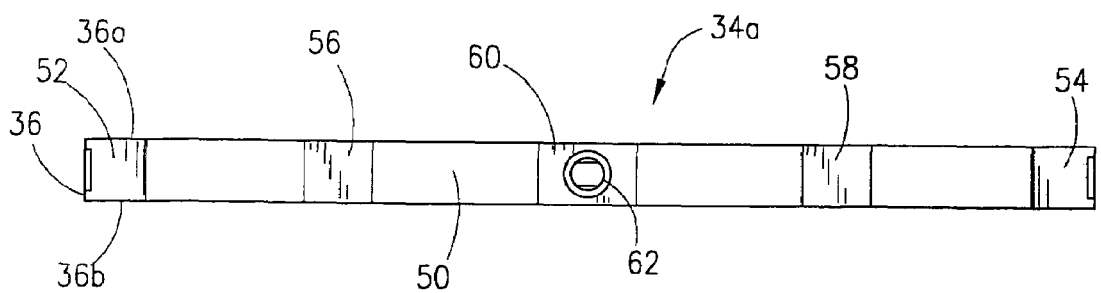
FIG. 2B is a side elevation view of the internal wafer of FIG. 2A.
Figure 2C:
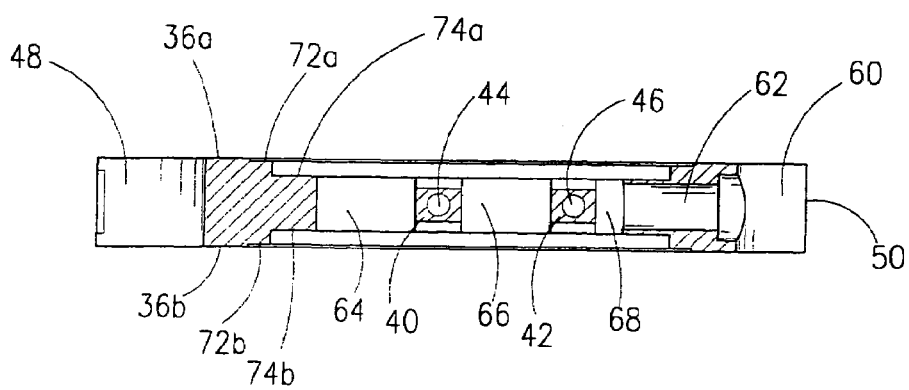
FIG. 2C is a cross-sectional view of the internal wafer of FIG. 2A taken from line 2C-2C.

The side elevation view of the internal wafer 34a of FIG. 2A will now be described with reference to FIG. 2B. The radially flat surface 50 is shown along with the aperture 62. The outer rim contains the upper rim surface 36a and the lower rim surface 36b and wherein both rim surfaces 36a, 36b will serve as sealing surfaces as will be described in greater detail below. As seen in FIG. 2C, upper rim surface 36a leads to a first ledge 72a and second ledge 74a while lower rim surface 36b leads to third ledge 72b and fourth ledge 74b.

Figure 3A:
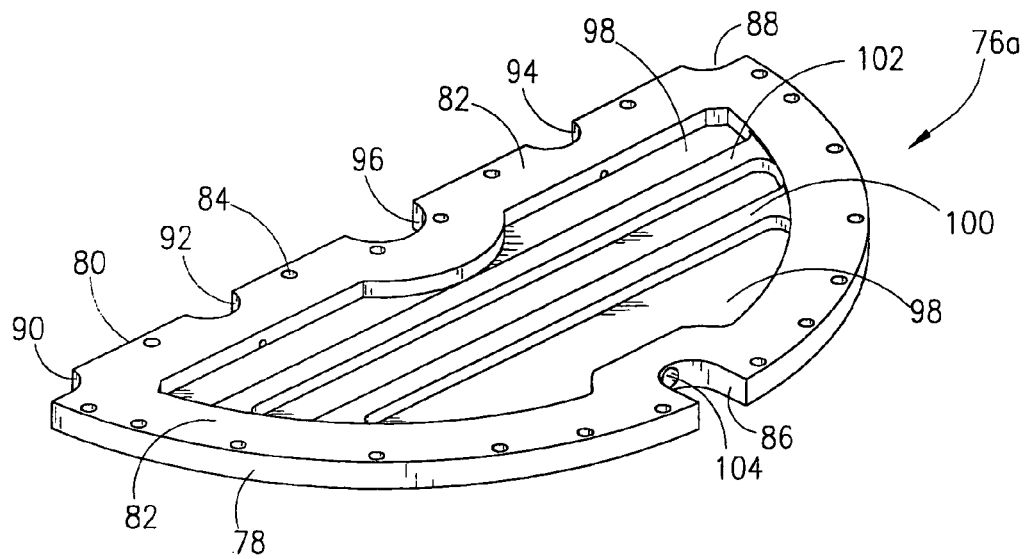
FIG. 3A is a perspective view of the second outer wafer.

Referring now to FIG. 3A, a perspective view of the second outer wafer 76a. In the preferred embodiment, the second outer wafer 76a is generally the same structurally as the first outer wafer 2a. Thus, second outer wafer 76a contains a semicircular outer edge 78 that extends to the radial surface 80. The semicircular outer edge 78 and radial surface 80 contains a rim 82, with the rim 82 having a plurality of openings, for instance as seen at 84, for placement of fasteners such as screws, or may contain O-ring grooves which are not shown in this figure. The semicircular outer edge 78 contains a first indentation 86 at the top portion (also referred to as the apex) of the wafer 76a. The indentation 86 is configured to receive a tubular member, as will be more fully set forth below. The functions of the tubular members are different and will be more fully set forth below.

The wafer 76a also contains a first corner indentation 88 and a second corner indentation 90, with the corner indentations 88, 90 being configured to also receive tubular members. The radial surface 80 contains a first side indentation 92 and a second side indentation 94, along with a center indentation 96, which is configured to receive and be operatively associated with a tubular member.

The wafer 76a has a solid back wall 98. In other words, the wafer 76a is in the form of a plate. The back wall 98 has two underflow weirs that traverse it, namely underflow weir 100 and underflow weir 102. The weirs 100, 102 are raised projections that will alter the flow pattern of the feed stream as will be more fully set forth below. The weirs 100, 102 also add to the structural support of the wafer 76a. For larger diameter systems, additional ribs and indentations for tubular members can be provided.

Figure 3B:
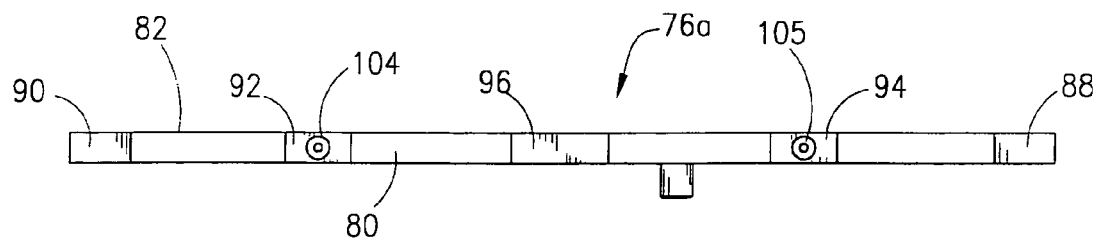
FIG. 3B is a side elevation view of the second outer wafer of FIG. 3A.
Figure 3C:
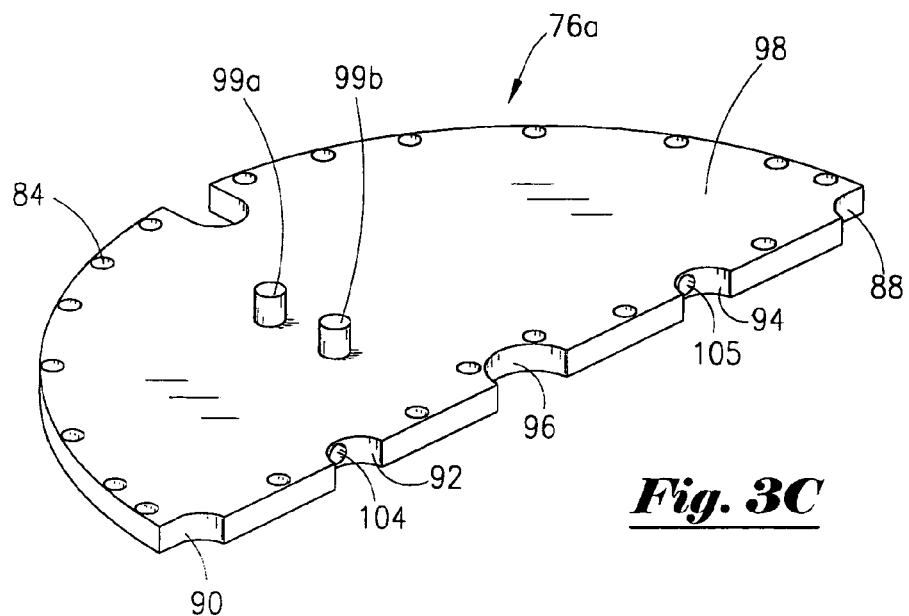
FIG. 3C is a perspective view of the first outer wafer of FIG. 1A from the opposite plane.

FIG. 3B is a side elevation view of the first wafer 76a of FIG. 3A. As noted earlier, like numbers appearing in the various figures refer to like components. Thus, the radial surface 80 is shown along with the indentations 88, 94, 96, 92, and 90. The indentation 92 has a redistribution aperture 104. The indentation 94 has redistribution aperture 105. FIG. 3C is a perspective view of the second outer wafer of FIG. 3A from the opposite plane, with this view depicting the solid back wall 98 as well as supports 99a and 99b.

Figure 4:
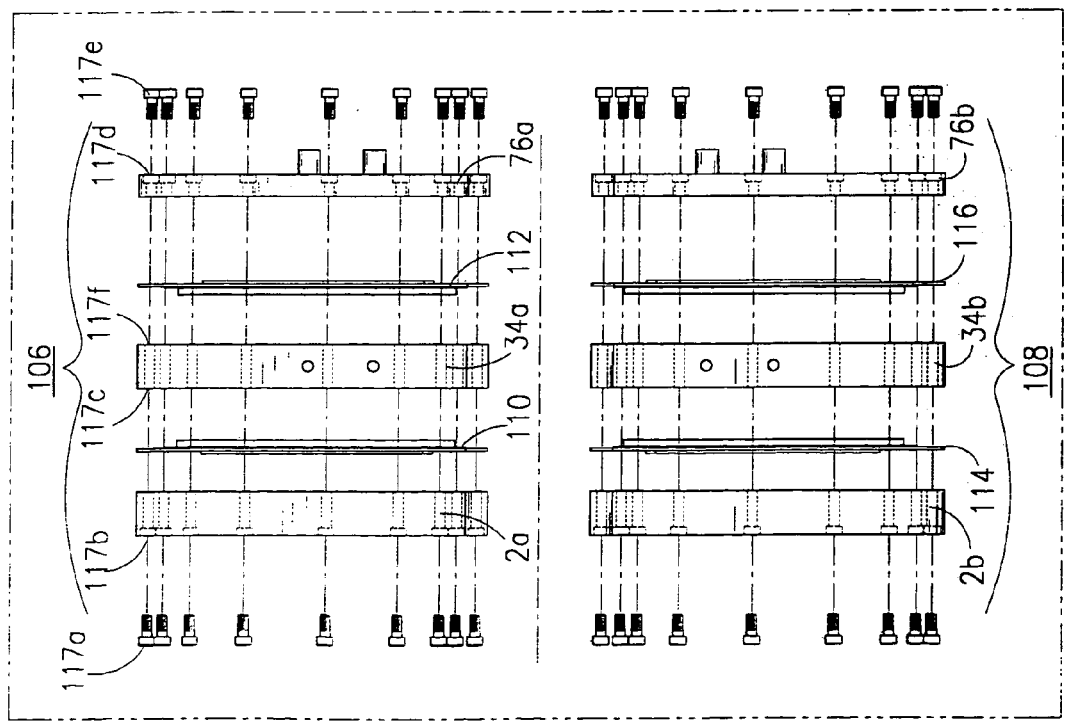
FIG. 4 is an exploded side elevation view of the two wafer assemblies.

Referring now to FIG. 4, an exploded side elevation view of the first wafer assembly 106 in tandem with a second wafer assembly 108 will now be described. As seen in FIG. 4, the wafer assembly 106 consists of the first outer wafer 2a, the first membrane member 110, the internal wafer 34a, the second membrane member 112, and then the second outer wafer 76a. Thus, a wafer assembly consists of the first outer wafer, membrane member, internal wafer, membrane member and then the outer wafer. It should be noted that the first outer wafer 2a is of the reinforced type, which is thicker and is structurally stronger than wafer 76a.

As shown in FIG. 4, a second wafer assembly 108 is in tandem with the first wafer assembly 106. Thus, the second wafer assembly 108 consists of the first outer wafer 2b, the first membrane member 114, the internal wafer 34b, the second membrane member 116, and the second outer wafer 76b. According to the teachings of the present invention, the first wafer assembly 106 is operatively attached in tandem to the second wafer assembly 108 to form tandem wafer assemblies.

A plurality of screws is shown for fastening a wafer assembly together. For instance, screw 117a fits through opening 117b in wafer 2a and screw 117c fits through opening 117d in wafer 76a with cooperating openings 117e/117f in wafer 34a so that wafers 2a, 34a and 76a are fastened together.

Figure 5A:
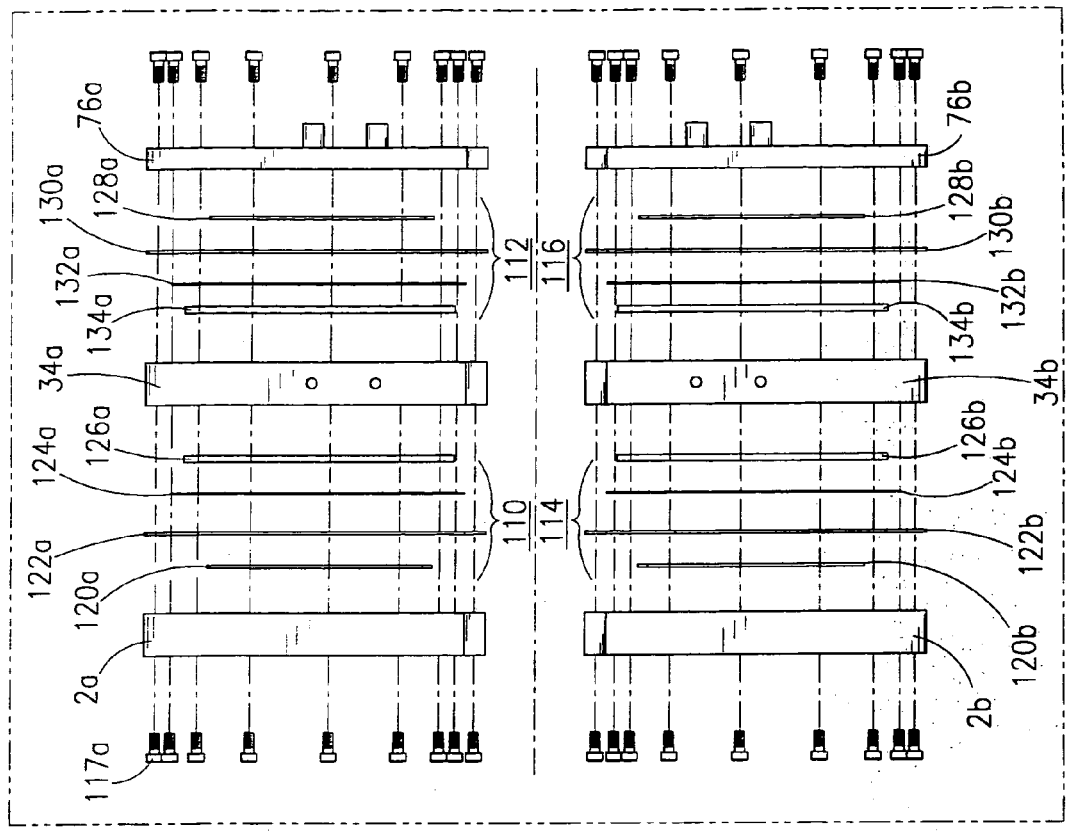
FIG. 5A is an exploded side elevation view of the two wafer assemblies seen in FIG. 4 detailing one embodiment of the membrane member.

FIG. 5A is an exploded side elevation view of the tandem wafer assemblies seen in FIG. 4 detailing one embodiment of the membrane member. FIG. 5A depicts the preferred embodiment of the polymeric membrane wafer assembly. In this preferred embodiment, the membrane member 110 that comprises a feed spacer screen 120a, a gasket 122a, a thin film membrane 124a and a sintered metal member 126a. The sintered metal member 126a is typically attached to member 34a by electron beam welding. Other forms of attachment common to those skilled in the art are also feasible. The member 126a may [also] be constructed of a porous metallic or porous ceramic support material. The porous support materials provide an engineered flat surface for the membrane fabric to lay on and are common to both the dynamic and polymeric embodiments herein disclosed.

The feed spacer screen can be a conventional screen. Commercially available metal or non-metallic screen materials are suitable. For example, member 126a can be obtained from Martin Kurz and Co. Inc. under the name DYNAPORE. Various grades of DYNAPORE may be used from grade TWM-80 to BWM-80. DYNAPORE grades made from five (5) layer screen filter media are the most preferred embodiment for this sintered metal member. Conventional gasketing materials can be used for sealing. Viton gasket available from DuPont is suitable. The sintered metal is commercially available from Mott Corporation under the name Sintered Metal. Suitable dynamic membranes have been discussed.

The second membrane member 112 comprises a feed spacer screen 128a, a gasket 130a, a thin film membrane 132a and a sintered metal 134a. The sintered metal member 134a is typically attached to member 34a by electron beam welding. Other forms of attachment common to those skilled in the art are also feasible. The member 134a may also be a porous metallic or porous ceramic support material.

The membrane member 114 comprises a feed spacer screen 120b, a gasket 122b, a thin film membrane 124b and a sintered metal member 126b. The sintered metal member 126b is typically attached to member 34a by electron beam welding. Other forms of attachment common to those skilled in the art are also feasible. In one preferred embodiment, the second membrane member 116 comprises a feed spacer screen 128b, a gasket 130b, a thin film membrane 132b and a sintered metal member 134b. The sintered metal member 134b can be attached to member 34a by electron beam welding, or some other suitable attachment method of sufficient mechanical integrity. The members 126a and 134a may also be constructed of a porous metallic or porous ceramic material.

It should be noted that different components within the membrane members are possible. For instance, the membrane support fabric, while not shown in FIG. 5A, may be included as part of the membrane members as depicted in FIG. 5B. The FIG. 5B is discussed below. Additionally, different sequencing and/or arrangement of the components within the membrane member is also possible as per the teachings of this invention.

FIG. 5B is an exploded side elevation view of the tandem wafer assemblies seen in FIG. 4 detailing a second embodiment of the membrane member package. The embodiment of FIG. 5B depicts the dynamic membrane. In this second preferred embodiment, the membrane member 400 comprises O-ring rope 409a, a wire mesh screen 410a, a powdered layer of adsorption media 412a, membrane 414a, membrane support fabric 416a, and O-ring rope 417a. Also included is a porous support material media 418a, which may be either a porous metallic or porous ceramic support material abutting the membrane support fabric.

Conventional O-ring rope can be used; O-ring rope available from American Seal Inc. under the name Cabres is suitable. The feed spacer screen (410a) can be conventional metal or non-metallic screen materials. Conventional membrane support fabric can be used, such as a Teflon polyetrafluoroethylene (PTFE) fabric (GoreTex), available from W. L. Gore, Inc. The membrane support fabric may also be polyester, nylon, Nomex or Kevlar type of fabric. Teflon, Nomex and Kevlar are trademarks of DuPont. As discussed, he porous metallic support material (418a) can be conventional. Conventional fabrication methods can be used to fabricate sheet or disc materials. The adsorption media may be placed on a porous sheet, or placed onto the surface of the thin film membrane. The adsorption media is commercially available from several vendors. The adsorption media will have surface areas between 100 to 1500 sq. meters per gram. Typical adsorbent material will be activated carbon, molecular sieves, zeolites, silica gels, alumina or other commercially available adsorbents. Impregnated adsorbents may also be used. Adsorbent materials may be impregnated with metals such as Sodium, Cobalt, Molybdenum, and Copper. Suitable metals are available from, e.g., (a) Calgon Co. for activated carbon and impregnated activated carbon, with the commercial trade names for non-impregnated being Cal F-200, and Cal F-400, and for impregnated is Centur (Sodium impregnated); (b) Grace Co. for molecular sieves/zeolites, silica gels, and the commercial trade names of molecular sieves/zeolites are 13X, 5A and others, and commercial trade names of silica gels are Grace Gel and others; (c) ALCOA Co. for Alumina, and the commercial trade names are A-200, A-400 and others; and (d) ExxonMobil Co. for Zeolites, with the commercial trade names being ZSM-5, MCM series and others.

The second membrane member 402 comprises O-ring rope 409b, a wire mesh screen 410b, a powdered layer of adsorption media 412b, membrane 414b, membrane 416b, O-ring rope 417b, and a porous support material 418b, that may be either metallic or ceramic.

The membrane member 406 comprises an O-ring rope 409c, a wire mesh screen 410c, a powdered layer of adsorption media 412c, membrane 414c, O-ring rope 417c, support fabric membrane 416c, and a porous support material 418c, that may be either metallic or ceramic. In one preferred embodiment, the second membrane member package 408 comprises an O-ring rope 409d, a wire mesh screen 410d, a powdered layer of adsorption media 412d, membrane 414d, membrane support fabric 416d, an O-ring rope 417d, and a porous support material 418d, that may be either metallic or ceramic. It should be noted that different components, or a different sequencing of components, within the membrane members are possible.

Figure 5C:
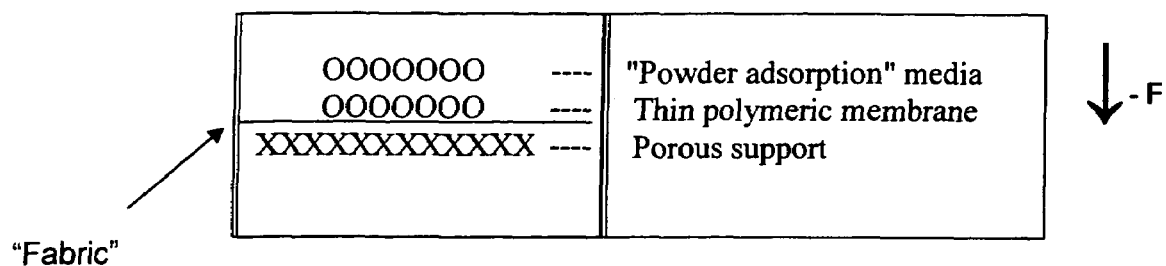
FIG. 5C is a schematic of the flow through the second embodiment seen in FIG. 5B.

FIG. 5C is a schematic of the flow through the dynamic embodiment seen in FIG. 5B. The flow stream "F" flows through the powder adsorption media, then through the thin film polymeric membrane and then through the membrane fabric, and in turn through the porous support.

Figure 6:
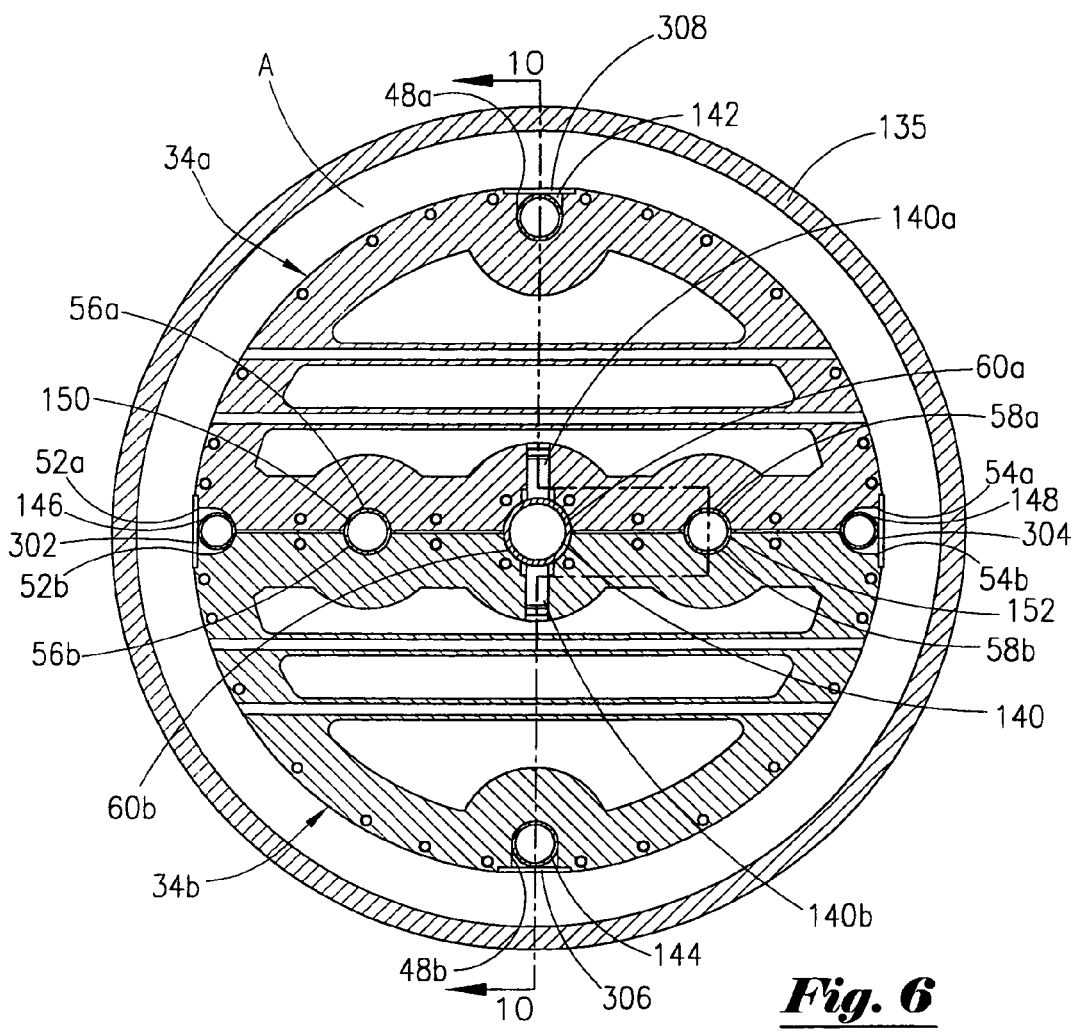
FIG. 6 is a plan view of two internal wafers in tandem.

Referring now to FIG. 6, a plan view of two internal wafers connected in tandem is shown. Thus, an internal wafer such as 34a and a second internal wafer 34b are operatively attached. Several methods of attachment are possible including bolts/screws 302, 304 aligned external to tubular members 148 and 149 are the preferred embodiments. Alternative methods could be open rectangular pin or harps screwed/bolted into wafers 34a and 34b. Compression bands may also be used. Since both wafers 34a, 34b are semicircular, the two coupled wafers form a cylindrical assembly with a generally circular cross-section. This cylindrical assembly allows for the entire device to be placed within a pressure vessel 135, and therefore, maximizes the space and volume within said vessel 135. In other words, the cylindrical assembly is the most efficient configuration for processing large quantities of feed stream within a pressure vessel. The vessel 135 may have a hot media, such as steam, placed within the annulus area A.

FIG. 6 depicts the center indentation 60a and 60b which form a cylindrical passage for placement of a tubular member 140 for the permeate, along with the apertures 140a, and 140b for passage of the permeate into tubular member 140. Also, the indentation 48a has a tubular member 142 therein for the inlet feed. The indentation 48b has a tubular member 144 therein for the feed (retentate) outlet. The indentation 52a and 52b has a tubular member 146 therein for the steam supply. The indentation 54a and 54b has a tubular member 148 for the steam supply. The side indentations 56a, 56b has a redistribution tubular member 150. The side indentations 58a, 58b has a redistribution tubular member 152.

The tubular member 142 will deliver the feed stream into the wafers. The tubular member 144 will be the outlet channel for the feed stream (retentate). The tubular members 146 and 148 are the supplemental steam supply inlet. The tubular members 150 and 152 are the redistribution channels for redistributing the retentate from the area of wafer 34a to the area of wafer 34b, as will be more fully described below. Attachment plates 306, 308 are also used to secure tubular members 144, 142.

Referring now to FIG. 7A, a schematic side elevation view of tandem wafer assemblies arranged in series will now be described. FIG. 7A depicts a wafer assembly that comprises an end wafer 160 attached to an internal wafer 162 that is attached to an end wafer 164. The end wafer 160 has two support projections, namely 166 and 168 for providing structural support and cooperating with a reciprocal set of support projections in a different plane from another wafer assembly. The end wafer 164 has two support projections, namely 170 and 172 for providing structural support and cooperating with a reciprocal set of support projections in a different plane. This wafer assembly is denoted as W1.

The reciprocal wafer assembly in tandem includes an end wafer 174 attached to an internal wafer 176 that is attached to an end wafer 178. The end wafer 174 has two support projections, namely 176 and 178 for providing structural support and cooperating with a reciprocal set of support projections in a different plane. The end wafer 178 has two support projections, namely 180 and 182 for providing structural support and cooperating with a reciprocal set of support projections in a different plane. This wafer assembly is denoted as W2.

Figure 7B:
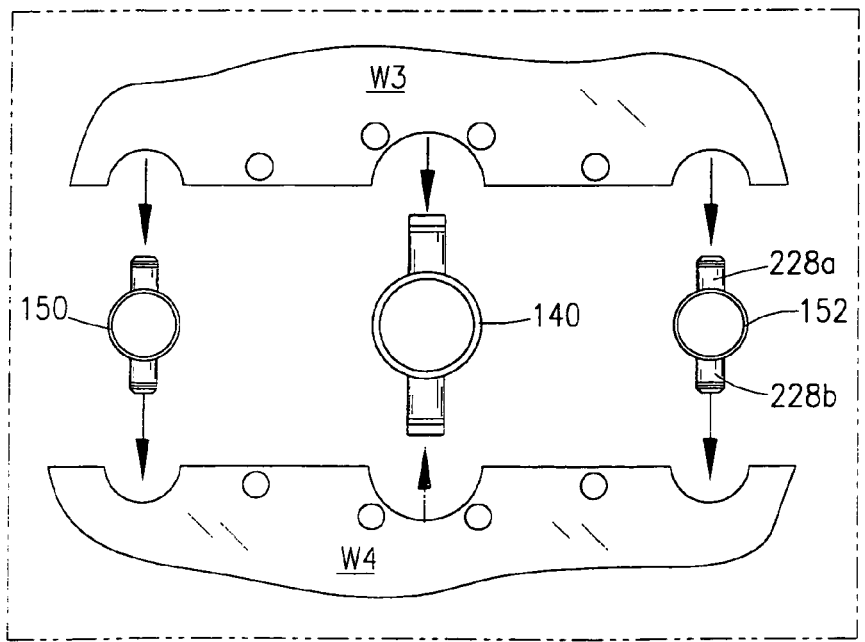
FIG. 7B is a schematic front view of one of the tandem wafer assemblies seen in FIG. 7A.

Wafer assemblies W3 and W4 are shown. The wafer assemblies W3 and W4 are essentially the same as W1 and W2. The wafer assembly W3 will be operatively attached to the wafer assembly W4. FIG. 7A depicts the flow through of the feed stream. More particularly, the feed stream would enter as through the arrows designated as 190, 192 via inlet channel 142. Referring to FIG. 7B, a schematic front view tandem wafer assembly W3, W4 will now be described. As seen in FIG. 7B, feed/retentate liquid from W3 flows out of W3 via redistribution channels 150 and 152 and enters W4 via these channels 150, 152; the permeate flows out of W3 and W4 and into tubular member 140.

Returning to FIG. 7A, the feed stream exits via the outlet channel 144 as designated by the arrows 194, 196. The portion of the feed stream that permeates through the membrane members exits via channel 140, which is denoted by the numerals 198 and 200. As per the teaching of this invention, this flow pattern is similar for all wafer assemblies (W1-W2, W5-W6, W7-W8) as shown in FIG. 7A.

FIG. 7A depicts the wafer assembly W5 that will be operatively attached to wafer assembly W6. Finally, wafer assembly W7 is shown operatively attached to wafer assembly W8. Wafer assemblies W5 and W6 are essentially the same as W3 and W4, and wafer assemblies W7 and W8 are essentially the same as wafer assemblies W5 and W6 except that in the W7 wafer assembly, the end wafer 2a is the reinforced type, and that in W8, the end wafer 2b is also the reinforced type. The internal wafers 34a and 34b, and the outer wafers 76a, 76b are also shown.

The FIG. 7A illustrates that the wafers are arranged in tandem, and then the tandem wafer assemblies are arranged in series. In other words, wafer W1 is in tandem with wafer W2. By adding the tandem wafer assemblies in series, the operator in effect increases the flow capacities for the apparatus. FIG. 7A also shows how the support projections will cooperate with an adjacent support projection on an adjacent wafer but in a different plane. For instance, support projections 170 and 172 of the end wafer 164 will abut a back wall 350 and wafer projections 206 and 208 of the end wafer 210 will abut the back wall 351 of wafer 164. This adds strength and distributes the compressive load when the tandem wafer assemblies are compressed into place in series.

Figure 8:
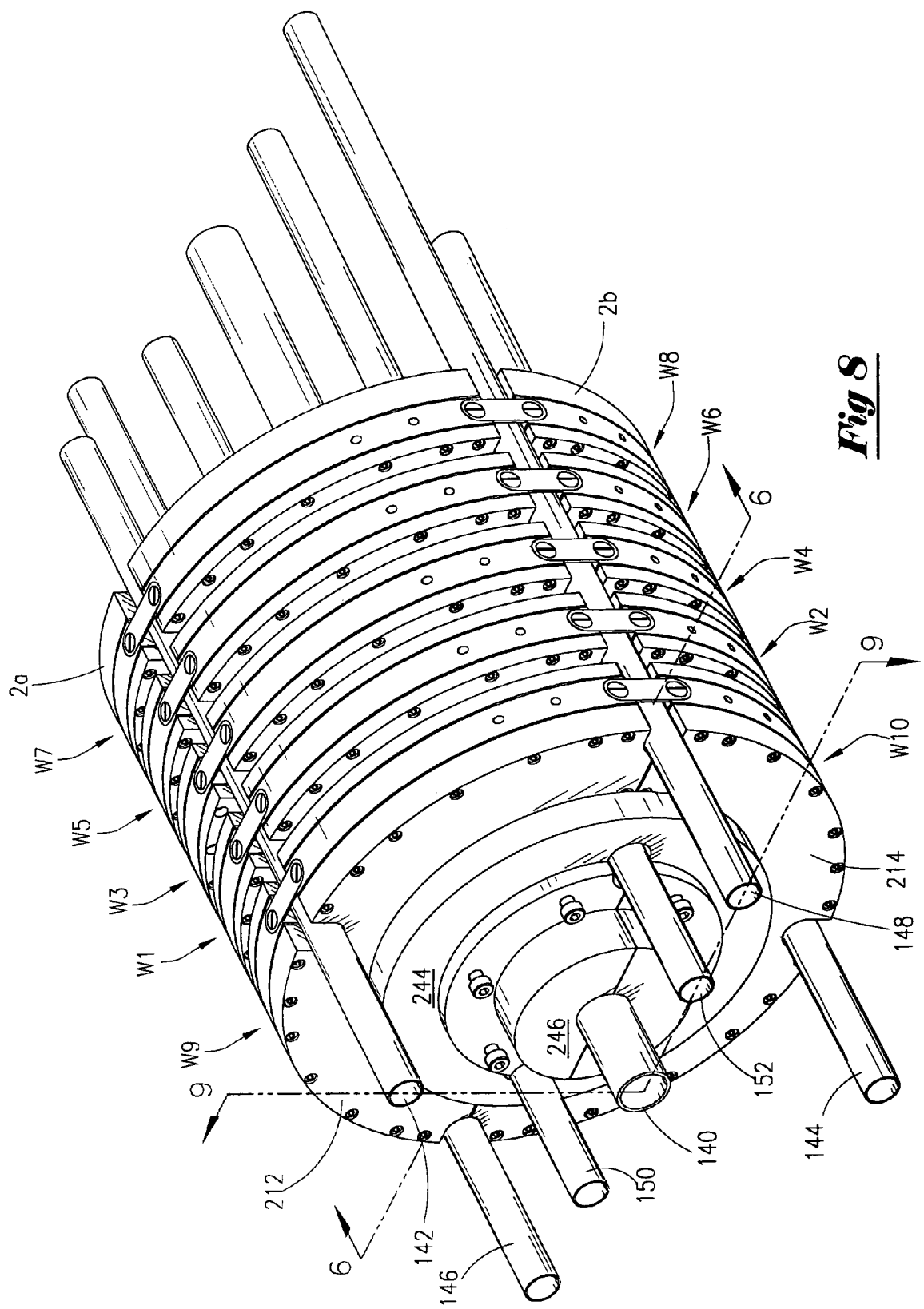
FIG. 8 is a perspective view of tandem wafer assemblies arranged in series along with the tubing members.

Referring now to FIG. 8, a perspective view of tandem wafer assemblies arranged in series along with the tubing members will now be described. In this view, the wafer assemblies W1, W2, W3, W4, W5, W6, W7, and W8 are shown. It should be noted that the end wafer 2a of wafer W7 and end wafer 2b of wafer W8 is of the reinforced type. The feed inlet tubular 142 is shown, the permeate tubular 140 is shown, and the feed outlet tubular 144 is shown in FIG. 8. The stopper plate 244 and the coupling plate 246 are shown, along with the redistribution channels 150, 152.

Figure 9:
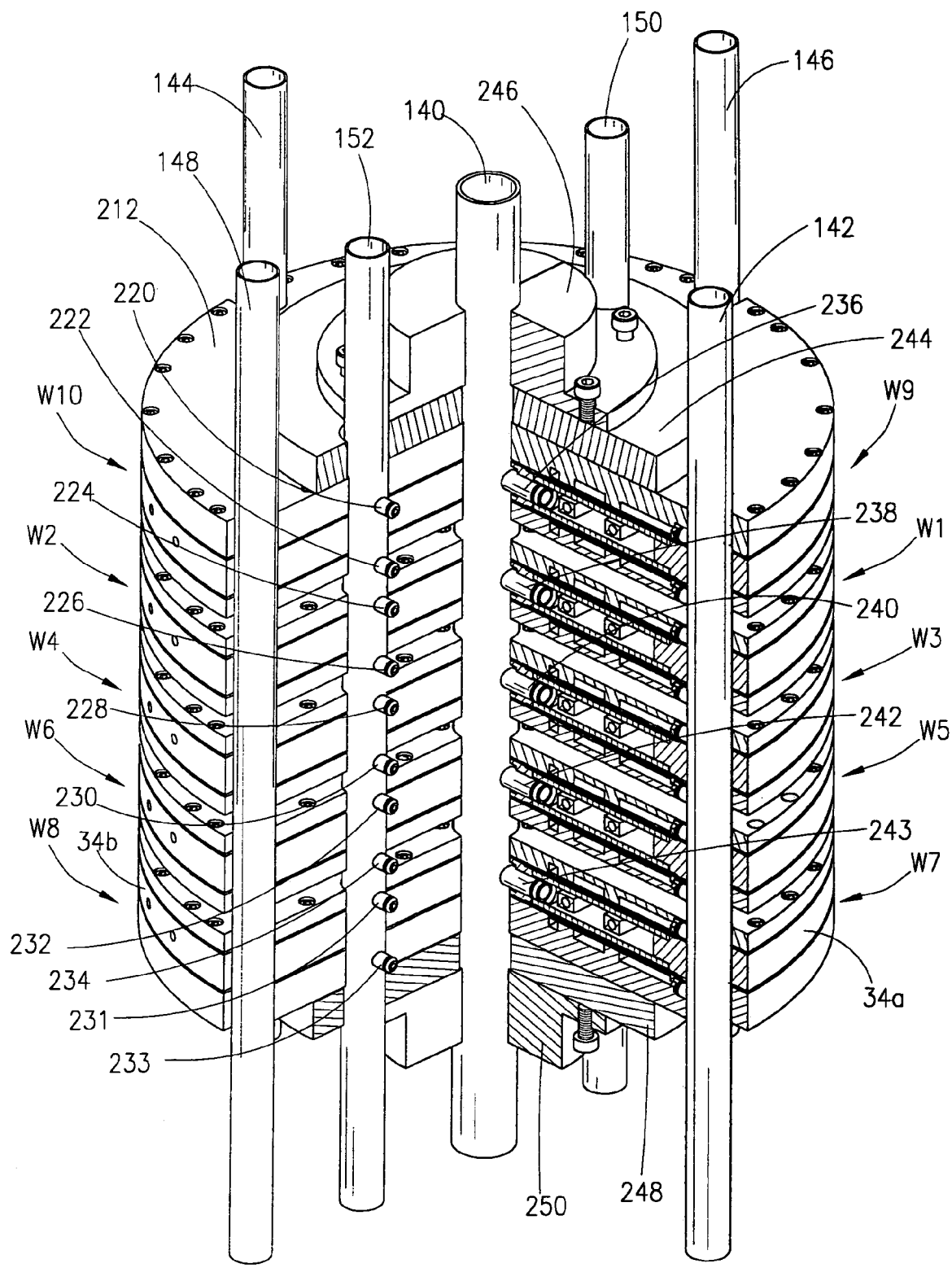
FIG. 9 is a partial cut away view of the tandem wafer assemblies seen in FIG. 8.

FIG. 9 is a partial cut away view of the tandem wafer assemblies seen in FIG. 8. Thus, the W1, W2, W3, W4, W5, W6, W7, and W8 wafer assemblies are shown. This partial cross-section depicts the redistribution channel 152 along with the nozzles 220, 222, 224, 226, 228, 230, 231, 232, 233 and 234. These nozzles direct the feed (retentate) from the first wafer assembly to the second wafer assembly arranged in tandem. For example, the feed is directed from wafer assembly W1 to wafer assembly W2 via nozzle 224 and nozzle 226. Additionally, permeate channel 140 is shown, along with the nozzles 236, 238, 240, 242 and 243 for directing the permeate produced from the wafer assemblies from the permeate zone (the permeate zone 262 is shown in FIG. 10) to the permeate channel 140 which is ultimately produced from the apparatus.

In FIG. 9, a first stopper plate 244 is braced together with a coupling plate 246, with the stopper plate 244 and coupling plate 246 being added in one preferred embodiment to aid in properly compressing the series of tandem wafer assemblies together. A second stopper plate 248 braced together with a coupling plate 250 is shown, with the stopper plate 248 and coupling plate 250 being added on the opposite side for the reciprocal compression of the series of tandem wafer assemblies together. It should be noted that in one preferred embodiment, the coupling plates are made up of two halves that are attached together, generally by a fastener means such as nuts and bolts. The stopper plates 244, 248 are attached also by fastener means such as nuts and bolts to the wafer assemblies. The stopper plates provide additional mechanical integrity to the assembly of wafers W1 through W8.

Figure 10:
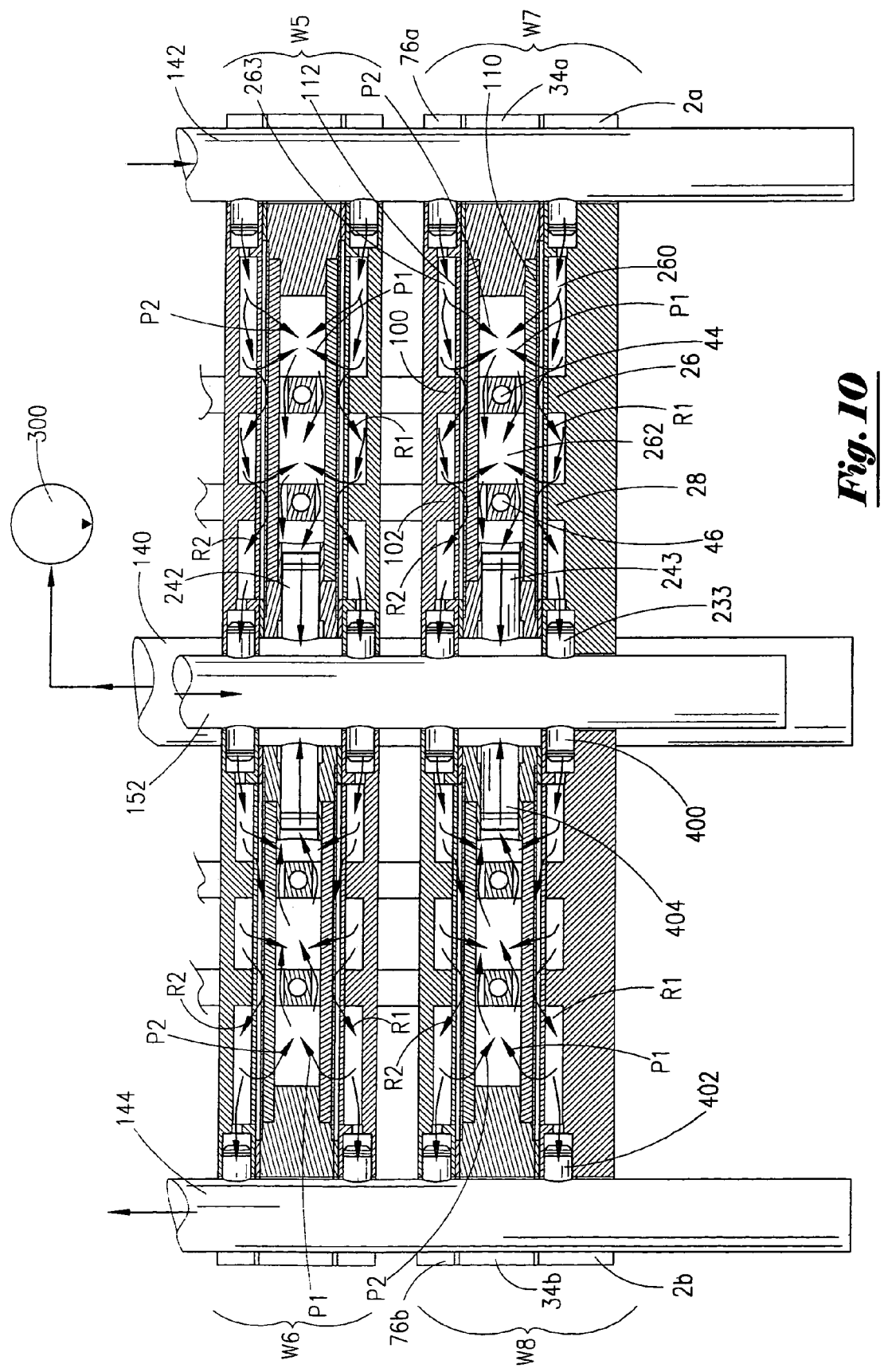
FIG. 10 is a cross-sectional view taken from line 10-10 in FIG. 6 of the preferred embodiment of the flow pattern through tandem wafer assemblies.

Referring now to FIG. 10, a cross section view of the preferred embodiment of the flow pattern through a series of tandem wafer assemblies will now be described. Thus, there is shown the first outer wafer 2a that is operatively attached to the internal wafer 34a. The internal wafer 34a is in turn operatively attached to the second outer wafer 76a of wafer assembly W7, as previously described. The first membrane member 110 is disposed within the first cavity created between the wafer 2a and the wafer 34a. The second membrane 112 is disposed within the second cavity created between the wafer 76a and the wafer 34a.

The feed stream will be channeled through the channel 260. The weir 26 and weir 28 will cause the feed stream to undergo turbulent flow. A portion of the stream will react with the membrane 110 and the permeate thus produced will be directed into the permeate zone 262 which in turn is directed to the permeate tubular 140 via the nozzle 243. The permeate path is shown by arrows "P". The portion of the feed stream that does not permeate through the membrane member 110 is known as the retentate, and this retentate flows through the retentate area that is shown by path arrows "R".

By design, the incoming feed stream is also channeled through the channel 263. The weir 102 and weir 100 will cause the feed stream to undergo turbulent flow. A portion of the stream will react with the membrane 112 and the permeate thus produced will be directed to the permeate zone 262 and then into the permeate tubular 140 via the nozzle 243. As noted earlier, the permeate flow path is shown by the arrow P. The portion of the inlet fluid stream that is unreacted, which is known as the retentate as previously mentioned, flows through the retentate area that is shown by the path arrow R.

In the preferred embodiment, the retentate from the first wafer assembly W7 is conducted to the tandem wafer assembly W8 via the redistribution channels 150, 152 (channel 150 is not shown in FIG. 10) where it will again be exposed to the similar process in that the feed stream (retentate) will be exposed to the weirs, and membrane members. The permeate will be directed to the permeate tubing 140 and the retentate will be directed to the outlet channel 144.

As illustrated in FIG. 10, similar flow patterns are present for all tandem wafer assemblies. More particularly, FIG. 10 also depicts the flow patterns for wafers W5 and W6. The P arrows depict flow for the permeate path and the R arrows depict flow for the retentate for wafer assemblies W5, W6, W7, and W8. For instance, retentate exits wafer W7 via nozzle 233, and enters via nozzle 400. Retentate will eventually exit wafer W8 via nozzle 402 into outlet channel 144. The permeate will enter permeate tubular 140 via nozzle 404. Additionally, the condenser and vacuum pump 300 which provides the suction to permeate channel 140, and in turn to the permeate zone, is also shown in FIG. 10.

Figure 11A:
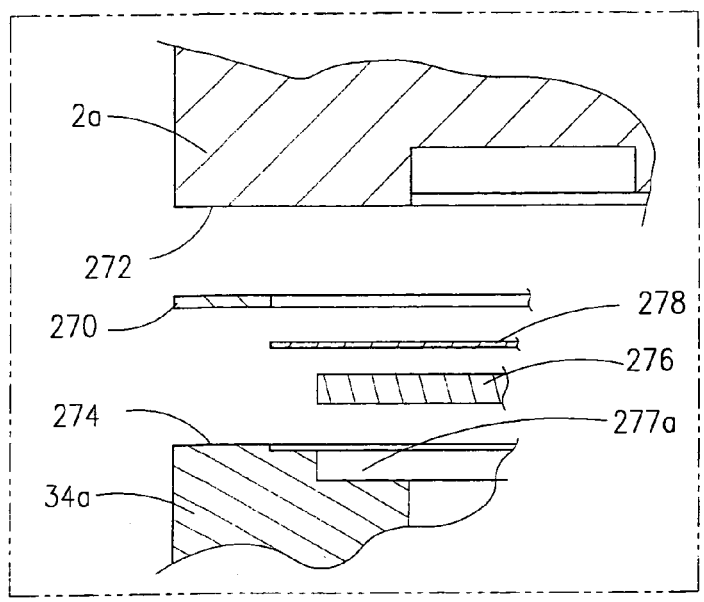
FIG. 11A shows a first embodiment of a seal member for the wafer assembly.

In FIG. 11A, a first embodiment of a seal member for the wafer assembly will now be described. The seal member shown in FIG. 11A is a gasket 270 that is well known in the art. The wafer 2a contains a rim 272 on its perimeter, and the internal wafer 34a contains a reciprocal rim 274 on its perimeter. A screen 276 (which for example may be a component of the membrane member package 110 or of membrane member package 400) is shown configured to be positioned within a ledge surface 277a of the wafer 34a. The thin film membrane is denoted by the numeral 278. Therefore, the gasket 270 is placed between the rims 272 and 274 in order to provide a seal means. The gasket 270 can be Viton, or another elastomer suitable for service with the desired feedstream, permeate, retentate, and process conditions.

Figure 11B:
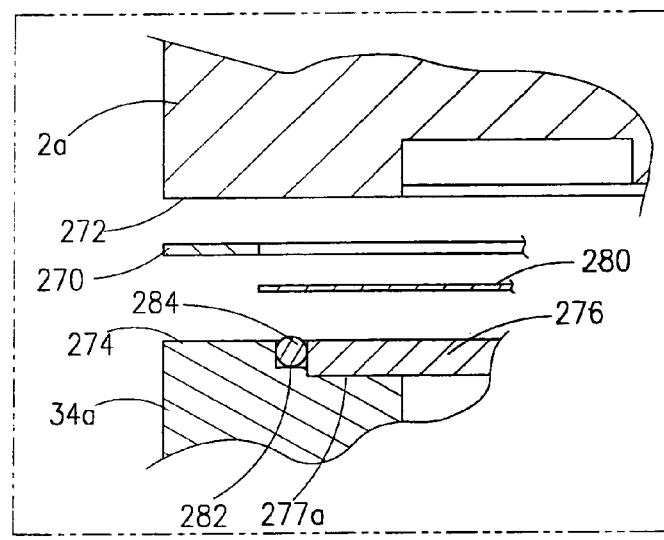
FIG. 11B shows a second embodiment of a seal member for the wafer assembly.

A second embodiment of a seal member for the wafer assembly is shown in FIG. 11B. In this embodiment, the screen 276 is used with the membrane member denoted by the numeral 280. The gasket 270 is again used. In this embodiment, a second ledge 282 is configured within the rim 274. An O-ring 284 is placed within this second ledge and is abutted by the screen 276. The O-ring 284 will provide a secondary sealing mechanism as it is compressed against the membrane member 280 which in turn is compressed against the gasket 270. O-rings are conventional (i.e., very well known in the art) and are commercially available from DuPont under the trademark Viton.

Figure 11C:
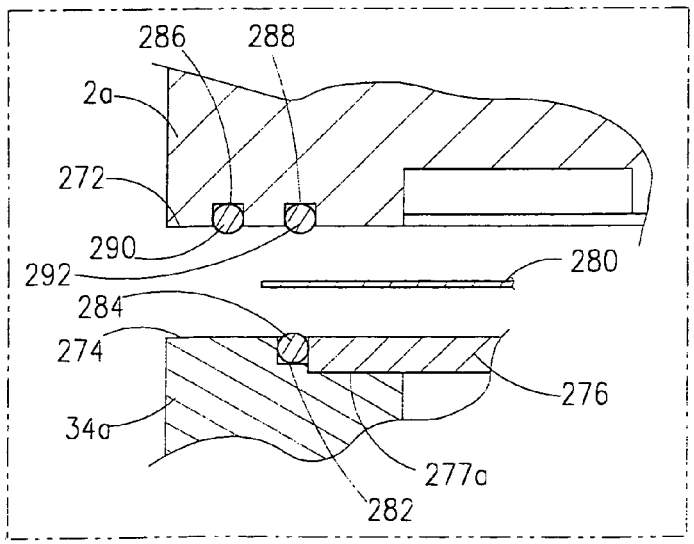
FIG. 11C shows a third embodiment of a seal member for the wafer assembly.

In FIG. 11C, a third embodiment of a seal member for the wafer assembly is shown. In this embodiment, the O-ring 284 is again positioned within the ledge 282. In the wafer 2a, two grooves are configured in rim 272, namely, groove 286 and groove 288. An O-ring 290 is placed within groove 286 and an O-ring 292 is within groove 288. This embodiment allows the O-ring 290 and the O-ring 284 to cooperate together for a sealing means. The O-ring 292 provides a redundant seal, with the seal occurring between the O-ring 292 and the membrane member 280.

The membranes described herein are useful for separating a desired component or species from a liquid feed. Perstractive and pervaporative separation can be used.

In perstractive separation, permeate is removed from the permeate zone using a liquid sweep stream. The permeate dissolves into the sweep stream and is conducted away by sweep stream flow in order to prevent the accumulation of permeate in the permeate zone. The sweep liquid preferably has an affinity for, and is miscible with, the permeate. In pervaporation, permeate is conducted away from the permeate zone as a vapor. A vacuum, or reduced pressure, is maintained in the permeate zone, and the desired species or component in the feed stream will vaporize upon transfer across the membrane. In pervaporation, the difference in vapor pressure between the feed stream in the retentate zone and the partial pressure of the permeate in the permeate zone leads to the transfer of the desired species or component across the membrane. While the membrane has been described in terms of a flat sheet, the separation process can employ a membrane in any workable configuration such as spiral-wound or hollow fibers.

Membrane separation should occur at a temperature less than the temperature at which the membrane would be physically damaged or decomposed. For hydrocarbon separations, the membrane temperature would range from about 25° C. to about 500° C., and preferably from about 25° C. to about 250° C.

The method is useful for separating a desired species or component from a feedstream. In particular, the method is useful for separating a desired species or component from a hydrocarbon feed stream. In an embodiment, aromatics are separated from a hydrocarbon feedstream.

As used herein, the term "hydrocarbon" means an organic compound having a predominantly hydrocarbon character. Accordingly, organic compounds containing one or more non-hydrocarbon radicals (e.g., sulfur or oxygen) would be within the scope of this definition. As used herein, the term "aromatic hydrocarbon" means a hydrocarbon-based organic compound containing at least one aromatic ring. The rings may be fused, bridged, or a combination of fused and bridged. In a preferred embodiment, the aromatic species separated from the hydrocarbon feed contains one or two aromatic rings. "Non-aromatic hydrocarbon" means a hydrocarbon-based organic compound having no aromatic cores. In an embodiment, the hydrocarbon feedstream has a boiling point in the range of about 25° C. to about 250° C., and contains aromatic and non-aromatic hydrocarbons. In a preferred embodiment, aromatic hydrocarbons are separated from a naphtha boiling in the range of about 25° C. to about 250° C. and containing aromatic and non-aromatic hydrocarbons. As used herein, the term "naphtha" includes light naphthas boiling from about 25° C. to about 100° C., intermediate naphthas boiling from about 100° C. to about 160° C., and heavy naphthas boiling in the range of about 160° C. to about 250° C. The term naphtha includes thermally cracked naphtha, catalytically cracked naphtha, and straight-run naphtha. Naphtha obtained from fluid catalytic cracking processes ("FCC") are particularly preferred due to their high aromatic content.

In a preferred embodiment, aromatics present in a naphtha feedstream preferentially adsorb onto the layer of selective adsorption media on the retentate side of a dynamic thin film polymer membrane. Pressure in the retentate zone ranges from about atmospheric pressure to about 100 psig. The temperature of the dynamic thin film polymer membrane would range from about 25° C. to about 250° C. Aromatics separated from the naphtha feedstream are conducted away from the permeate zone. Permeate zone pressure ranges from about atmospheric pressure to about 1.0 mm hg.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

What is claimed is:

1. A method for separating a desired species from a feed stream comprising:
   (a) conducting the feedstream into a retentate zone containing a dynamic membrane comprising (i) an adsorbent layer in fluid contact with the retentate zone, the adsorbent layer being selective for adsorption of the desired species, and (ii) a thin film polymer membrane, the thin film polymer membrane being selective for permeating the desired component and comprising an upstream side in contact with the adsorbent layer and a downstream side;
   (b) heating the feedstream in the retentate zone;
   (c) heating the permeate stream in the permeate zone with a hot media;
   (d) adsorbing the desired species onto the adsorbent layer and permeating the desired species through the thin film polymer membrane to the downstream side; and
   (e) conducting the desired species away from a permeate zone in fluid contact with the downstream side of the thin film polymer membrane.

2. The method of claim 1 further comprising:
   (a) conducting a retentate stream from the retentate zone to a second retentate zone containing a second dynamic membrane; and
   (b) conducting the desired species away from a second permeate zone.

3. The method of claim 2 wherein said adsorbent layer comprises powdered adsorption media selected front the group consisting of activated carbon, molecular sleves, zeolites, silica gel; alumina, and mixtures thereof, and wherein the thin film polymer membrane further comprises a support material selected from the group consisting of porous metallic material, porous ceramic material, and combinations thereof.

4. The method of claim 2 wherein the feedstream comprises aromatic and non-aromatic hydrocarbon, wherein the desired species is aromatic hydrocarbon, and wherein the thin film polymer membrane is selected from the group consisting of: polyimide/aliphatic polyester copolymers, crosslinked copolymers of aliphatic polyester diols and dianhydride, halogenated polyurethanes, diepoxide crosslinked/esterified polyimide-aliphatic polyester copolymers, polyimide aliphatic polyester copolymers, multi-block polymer comprising a urea prepolymer chain extended with a compatible second prepolymer, polycoarbonate, highly aromatic anisotropic polyurea/urethane membranes, highly aromatic polyurea/urethane membranes, isocyanurate crosslinked polyurethane membranes, isocyanerate crosslinked polyurethane membranes, multi-block polymer comprising and imide or amide-acid prepolymer chain extended with a compatible second prepolymer, multi-block polymer comprising an oxazolidone prepolymer chain extended with a compatible second prepolymer, multi-block polymer comprising a urea prepolymer chain extended with a compatible second prepolymer, multi-block polymer comprising of first prepolymer made by combining epoxy with diamine, chain extended with a compatible second prepolymer, highly aromatic polyurea/urethane, multi-block polymer comprising a first amide acid prepolymer, chain extended with a compatible second prepolymer, ester prepolymer, made by combining epoxy with polyester chain extended with a compatible second prepolymer, crosslinked polyester amide membranes, halogenated polyurethanes, saturated polyesters and crosslinked membranes, unsaturated polyesters and crosslinked membranes, polyimide/aliphatic polyester copolymers without pendant carboxylic acid groups, polyphthalate carbonate membranes and polyarylate membranes, and mixtures thereof.

5. The method of claim 2 wherein the first and second dynamic membranes each further comprise first and second wafer assemblies, wherein at least one of the first and second wafer assemblies contains at least one underflow distribution weir.

6. The method of claim 5 wherein at least one of the first and second wafer assembly contains a wire mesh screen positioned between the adsorbent layer and the underflow distribution weir.

7. The method of claim 5 wherein at least one of the first and second wafer assembly contains a membrane support fabric selected from the group consisting of a Teflon, polyester, nylon. Nomex, and Kevlar, and combinations thereof, and wherein said membrane support fabric is situated between the thin film polymer membrane and the porous support.

8. The method off claim 5 wherein (i) at least one wafer assembly contains at least one rib member located on the permeate side of the thin polymer membrane for supporting the membrane; and (ii) at least one rib member contains a bore therethrough;
   and wherein tile method further comprises conducting a heat transfer stream through the bore in order to heat the feed stream, the heat transfer stream being at least one of steam, hot gas, hot oil, and hot liquids.

9. The method of claim 2 further comprising suctioning the first and the second permeate stream from said permeate zone.

10. The method of claim 8 comprising at least two wafer assemblies arranged in tandem wherein the wafer assemblies have a space between each tandem wafer assembly, and the wafer assemblies are housed within a pressure vessel, and providing a hot media within the pressure vessel wherein heat is transferred from the hot media to the retentate zone of the tandem wafer assemblies.

11. The method of claim 10 wherein the hot media is steam.

12. The method of claim 10 wherein the separation is performed under essentially isothermal conditions.

* * * * *